(12) United States Patent
Kim et al.

(10) Patent No.: US 12,411,738 B2
(45) Date of Patent: Sep. 9, 2025

(54) DISTRIBUTED CLOUD SYSTEM, DATA PROCESSING METHOD OF DISTRIBUTED CLOUD SYSTEM, AND STORAGE MEDIUM

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong-si (KR); Su-Min Jang, Sejong-si (KR); Jae-Geun Cha, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 91 days.

(21) Appl. No.: 18/493,946

(22) Filed: Oct. 25, 2023

(65) Prior Publication Data

US 2024/0143448 A1 May 2, 2024

(30) Foreign Application Priority Data

Oct. 26, 2022 (KR) .................... 10-2022-0139419
Jul. 4, 2023 (KR) .................... 10-2023-0086208

(51) Int. Cl.
*G06F 11/20* (2006.01)
*G06F 3/06* (2006.01)
(Continued)

(52) U.S. Cl.
CPC .......... *G06F 11/1451* (2013.01); *G06F 3/065* (2013.01); *G06F 11/203* (2013.01); *H04L 67/14* (2013.01); *G06F 2201/84* (2013.01)

(58) Field of Classification Search
CPC ............ G06F 11/1451; G06F 11/2048; G06F 11/203; G06F 2201/815; G06F 3/065;
(Continued)

(56) References Cited

U.S. PATENT DOCUMENTS 10,298,670 B2  5/2019  Ben-Shaul et al.
10,673,935 B2  6/2020  Son et al.
(Continued)

FOREIGN PATENT DOCUMENTS

KR  10-0763781 B1  10/2007
KR  10-1219816 B1  1/2013
(Continued)

OTHER PUBLICATIONS

Lanlan Rui et al., "Service migration in multi-access edge computing: A joint state adaptation and reinforcement learning mechanism", Journal of Network and Computer Applications, Apr. 5, 2021.
(Continued)

*Primary Examiner* — Marcin R Filipczyk
(74) *Attorney, Agent, or Firm* — LRK PATENT LAW FIRM

(57) ABSTRACT

Disclosed herein are a distributed cloud system, a data processing method of the distributed cloud system, a storage medium. The data processing method of the distributed cloud system includes running an application of an edge computing system requested by a user device, generating a snapshot image of the application, and storing the generated snapshot image and transmitting the stored image during migration.

3 Claims, 23 Drawing Sheets

(51) Int. Cl.
*G06F 11/14* (2006.01)
*H04L 67/14* (2022.01)

(58) Field of Classification Search
CPC . G06F 2201/84; H04L 67/10; H04L 67/1097; H04L 67/289; H04L 67/14
See application file for complete search history.

(56) References Cited

U.S. PATENT DOCUMENTS

| | | |
|---|---|---|
| 10,761,952 B2 | 9/2020 | Selvaraj et al. |
| 10,929,379 B2 | 2/2021 | Venkataramanappa et al. |
| 11,036,536 B2 | 6/2021 | Wang |
| 11,175,960 B2 | 11/2021 | Kim et al. |
| 11,252,159 B2 | 2/2022 | Kannan et al. |
| 12,001,296 B1* | 6/2024 | Hare Ram Singh ......................... G06F 11/1471 |
| 12,068,916 B2* | 8/2024 | Kattepur .................. G06N 5/02 |
| 12,107,915 B2* | 10/2024 | Kim .................... H04L 67/1097 |
| 2017/0041384 A1 | 2/2017 | Son et al. |
| 2020/0084202 A1 | 3/2020 | Smith et al. |
| 2020/0379805 A1* | 12/2020 | Porter .................. G06F 9/5072 |
| 2021/0126846 A1 | 4/2021 | Yi et al. |
| 2022/0092024 A1* | 3/2022 | Kavaipatti Anantharamakrishnan ................. G06F 16/182 |
| 2022/0164186 A1 | 5/2022 | Pamidala et al. |
| 2024/0095315 A1* | 3/2024 | Bartfai-Walcott .... G06F 21/107 |
| 2024/0273411 A1* | 8/2024 | Mueck .................. H04L 9/3263 |

FOREIGN PATENT DOCUMENTS

| | | |
|---|---|---|
| KR | 10-2017-0017049 A | 2/2017 |
| KR | 10-2232364 B1 | 3/2021 |
| KR | 10-2245340 B1 | 4/2021 |
| KR | 10-2021-0049541 A | 5/2021 |
| KR | 10-2022-0062836 A | 5/2022 |
| KR | 10-2023-0024416 A | 2/2023 |

OTHER PUBLICATIONS

Shiqiang Wang et al., "Dynamic Service Migration in Mobile Edge Computing Based on Markov Decision Process", IEEE/ACM Transactions on Networking, vol. 27, No. 3, Jun. 2019.

Pantelis A. Frangoudis et al., "Service migration versus service replication in Multi-access Edge Computing", 2018 14th International Wireless Communications & Mobile Computing Conference (IWCMC), Jun. 2018.

\* cited by examiner

DISTRIBUTED CLOUD SYSTEM, DATA PROCESSING METHOD OF DISTRIBUTED CLOUD SYSTEM, AND STORAGE MEDIUM

CROSS REFERENCE TO RELATED APPLICATIONS

This application claims the benefit of Korean Patent Application Nos. 10-2022-0139419, filed Oct. 26, 2022 and 10-2023-0086208, filed Jul. 4, 2023, which are hereby incorporated by reference in their entireties into this application.

BACKGROUND OF THE INVENTION

1. Technical Field

The present disclosure relates generally to distributed cloud technology, and more particularly to data processing and service migration technology for edge computing in a distributed cloud environment.

2. Description of Related Art

A migration function for service migration in a distributed cloud environment is provided to maintain a seamless service in a cloud environment in which services are redeployed in real time. Migration is performed between edge clouds or between an edge cloud and another cloud in consideration of aspects of resource deficiency, failure occurrence, and cost efficiency.

Further, a proximity service in an edge cloud requires a seamless (uninterrupted) service so as to support a mobile service. Therefore, as a key function of service migration management, a function of migrating a container- or virtual machine-based application is proposed as a scheme for overcoming failures in distributed clouds.

Currently, in order to overcome processing and transmission delay caused by central cloud concentration of rapidly increased data generated by large-scale terminals desired by a user, technology for providing an intelligent cloud edge service which processes data at a location closer to a terminal has been developed, and related service systems have been released. Among the related service systems, Kubernetes operated as a single cluster is a tool that is designed to orchestrate and integrally operate an Open Container Initiative (OCI)-based container environment and is the most widely used tool at the present time.

In order to provide a service by interconnecting cloud edges and core clouds that are distributed, research into various methods has been conducted. For this, as L7 layer-based service mesh technology, OpenShift (Istio) in an open source camp has been actively conducted. The service mesh is a program developed for interconnection between microservices. This method allows a control plane to be shared on multiple networks and allows clusters to communicate with each other through a gateway, and thus there is no need to directly connect two networks to each other. Further, various types of software having the functionality of connecting multiple networks using IPsec tunneling at the L3 network level are actively under development.

In this way, edge computing requires the role of processing data at a location closer to a terminal and performing distributed collaboration between cloud-edge-terminals in order to perform processing attributable to cloud centralization of a large amount of data generated by large-scale edge terminals and overcome a transmission delay.

In order to satisfy requirements such as low-latency terminal proximity processing in edge computing without relying on simple deployment based on clusters, data and application software need to be moved in real time, and this has become an even more essential requirement for a mobility (autonomous driving) service.

However, in an existing edge system, a management method in which multiple clusters are taken into consideration is insufficient.

Further, the existing edge system has been provided in a form that is not optimized for bare metal, a container, a Function as a Service (FaaS), etc.

Further, the existing edge system does not provide a resource addition method for guaranteeing performance when available resources are insufficient.

Furthermore, the existing edge system needs to be designed at the level of an application for vertical/horizontal collaboration.

Furthermore, the existing edge system has inadequate network structures for connecting multiple clusters at high speed.

Furthermore, the existing edge system is problematic in that the performance of Open Container Initiative (OCI) used in Kubernetes is insufficient (i.e., latency occurs in a service sensitive to a response speed).

Furthermore, the existing edge system has no technology in architecture for perfect collaborative solutions.

Meanwhile, Korean Patent Application Publication No. 10-2023-0024416 entitled "Method and Apparatus for Migration of Virtual Machine across Cloud Platform, and Storage Medium and Electronic apparatus" discloses an apparatus and method for migrating virtual machines one by one to the disk storage library of a target virtual machine in a target cloud platform.

SUMMARY OF THE INVENTION

Accordingly, the present disclosure has been made keeping in mind the above problems occurring in the prior art, and an object of the present disclosure is to provide service migration for efficient collaboration between clusters.

Another object of the present disclosure is to provide a high-speed network connection between multiple clusters for a collaboration service.

A further object of the present disclosure is to provide optimal management for collaboration between clusters on a connected network.

In accordance with an aspect of the present disclosure to accomplish the above objects, there is provided a data processing method of a distributed cloud system, including running an application of an edge computing system requested by a user device, generating a snapshot image of the application, and storing the generated snapshot image and transmitting the stored image during migration.

The application may maintain an uninterrupted service connection with the user device.

The data processing method may further include storing a current state of the application as the snapshot image.

The data processing method may further include, when migration is performed, restoring the snapshot image.

In accordance with another aspect of the present disclosure to accomplish the above objects, there is provided a distributed cloud system, including a storage, a processor, and a network system coupled to a computer system, wherein the processor is configured to run an application of an edge computing system requested by an external device, generate a snapshot image of the application, and store the generated snapshot image in the storage and transmit the stored image during migration.

The application may maintain an uninterrupted service connection with the external device.

A current state of the application may be stored as the snapshot image.

When migration is performed, the snapshot image may be restored.

In accordance with a further aspect of the present disclosure to accomplish the above objects, there is provided a storage medium for storing a computer-executable program, the computer-executable program including running an application of an edge computing system requested by a user device, generating a snapshot image of the application, and storing the generated snapshot image, and transmitting the stored image during migration.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
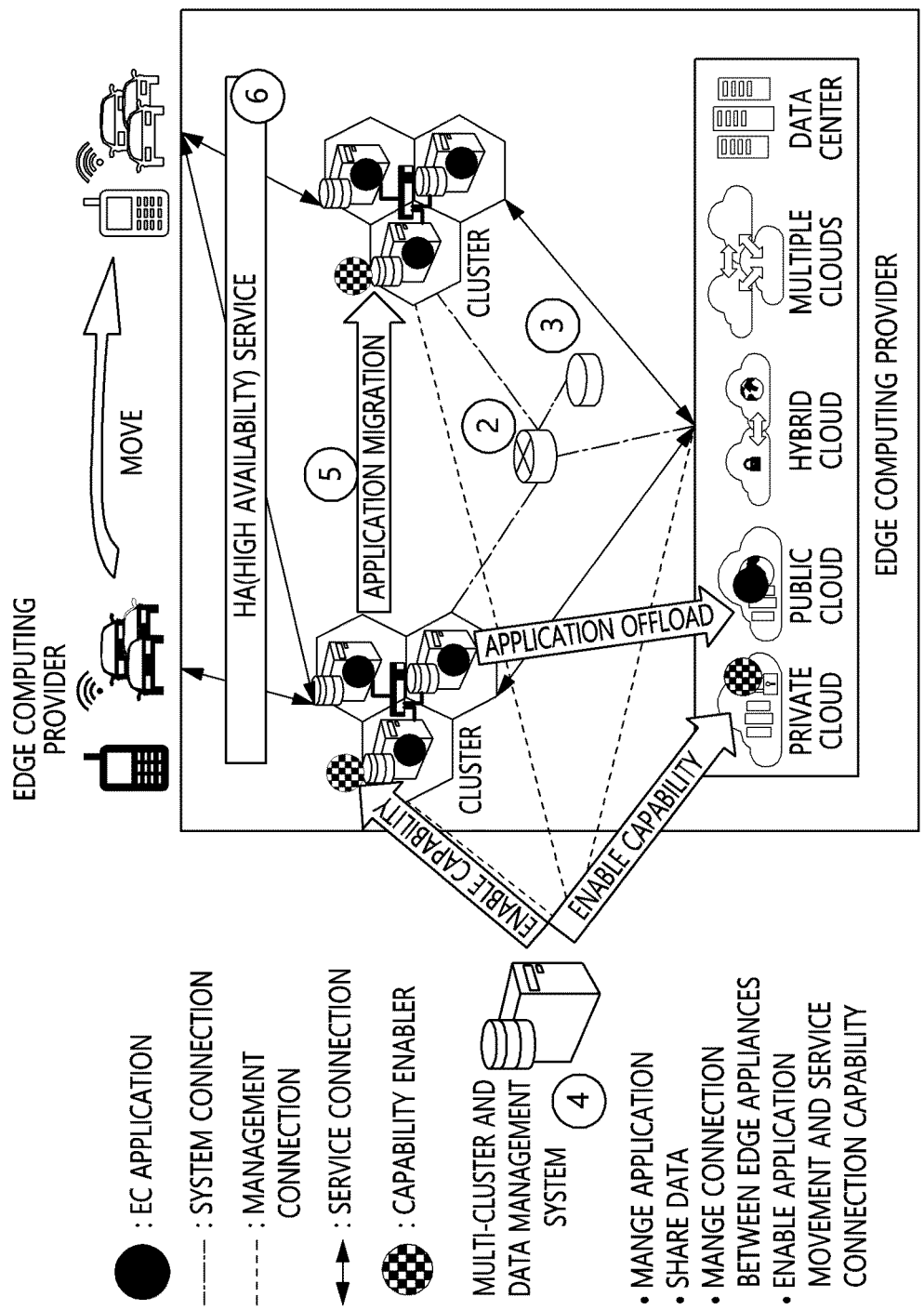
FIG. 1 is a diagram illustrating an edge service system according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the attached drawings.

FIG. 1 is a diagram illustrating an edge service system according to an embodiment of the present disclosure.

Referring to FIG. 1, an edge service system according to an embodiment of the present disclosure is illustrated.

The edge service system according to the embodiment of the present disclosure may correspond to a distributed cloud system.

Edge computing essentially requires tasks such as performing services in proximity to a user or deploying data at the location near the user. Therefore, in edge computing, a cloud, an edge, and a user terminal placed at different locations need to be connected to each other over a network, and individual edges need to be connected to each other. It can be seen that the system connected in this way is distributed and applications running on the distributed system are distributed and deployed as occasion demands. Therefore, with the progress of the service, the distributed and deployed applications are moved in conformity with the purpose of the service depending on the movement state of the user or the load of the network and the system. Also, in order for the moved service to be continuously and seamlessly provided, service connection together with the migration of applications needs to be maintained.

In the edge service system, vertical collaboration may correspond to a collaboration structure between a core cloud and an edge, and horizontal collaboration may correspond to a collaboration structure between edges. As illustrated in FIG. 1, the edge service system requires network connections for respective collaborations. For this, in the edge service system, tunneling-based high-speed networks may be configured, and shared storage and a shared repository for interconnecting clusters in respective networks to each other may be included in the edge service system.

Figure 2:
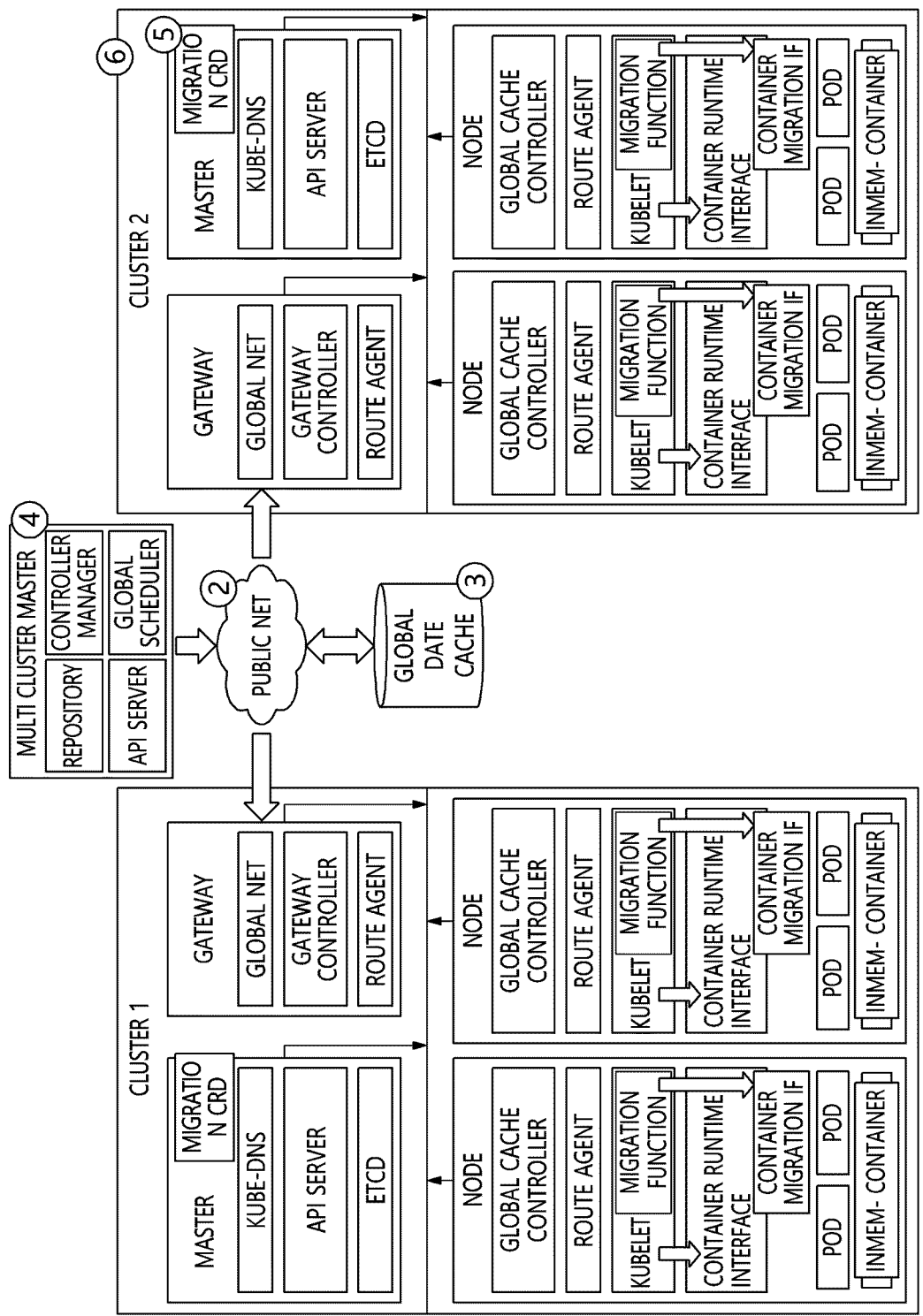
FIG. 2 is a diagram illustrating a multi-cluster structure for collaboration including migration according to an embodiment of the present disclosure.

FIG. 2 is a diagram illustrating a multi-cluster structure for collaboration including migration according to an embodiment of the present disclosure.

Referring to FIG. 2, an edge service system may be operated and managed by a global scheduler, which takes charge of overall management.

In the edge service system, a cluster for migration among multiple clusters is connected to an additional cluster (including a cloud) based on the multi-cluster structure, thus supporting various types of services.

Here, the cluster may include a management function for smoothly providing a gateway connection function and a routing function between clusters for the purpose of fast data transmission across the multiple clusters, and may be linked to a platform management function.

Migration may be composed of an application migration process and a related data migration process, and may be configured to capture the application state in a format that can be transmitted in real-time, and securely and efficiently store the same in the form of a snapshot.

Furthermore, the cluster may include a function of providing an interworking interface and data movement convenience so as to migrate a user service and large-capacity data on the corresponding cluster. For this, the cluster may include a global repository for fast data movement (transfer) between clusters.

The cluster is configured such that the migration of a service to be run in each platform or a distributed cloud for offloading for vertical or horizontal collaboration is performed and managed by running an enabler for providing a migration function to a master and executing an agent for operation in each node or cluster.

Furthermore, the cluster may provide an uninterrupted service for edge computing proximity service to support the most important mobility service. Therefore, the cluster may provide a high-availability service through a TCP-based proxy supporting failover for collaboration tasks.

Edge computing may maximize the efficiency of large-capacity data processing and a distributed environment so as to smoothly provide the edge computing service.

Here, edge computing may consider a horizontal distributed environment between cloud edges and a vertical distributed environment between a cloud edge and a core cloud.

Here, edge computing may provide an edge computing collaboration function based on the considerations.

Edge computing may provide interconnection between clusters and high-speed distributed deployment in order to allow services applied to the distributed environment to be locally distributed and deployed as well as across the clusters and to be connected to a high-speed network.

In this case, edge computing may be designed in consideration of a network connection function on multiple cluster nodes in a cloud edge system and interfaces corresponding thereto.

Furthermore, edge computing may include a fast data movement (migration) function and a repository association (link) function, together with the network connection function.

The cluster may perform a service movement (migration) task by mainly processing an application service migration process and a related data migration process.

Furthermore, the cluster may support a fast data migration task between nodes configuring a global scheduler (GS) to perform offloading. The cluster may provide an additional management function for multi-cluster interconnection to perform data migration and service migration between multiple clouds.

Furthermore, the cluster may be interconnected to the global scheduler to perform the task of monitoring the status of a service running on each cluster, selecting a cluster to which the service is to be migrated, and deploying the service. For this, each cluster may include a repository for managing monitoring information configured in the corresponding cluster and a function of managing the repository.

Further, the cluster may perform a network separation and resource separation function so that information configured in each cluster is separable into respective clusters. The migration function to be performed may include a function of performing a resource-concentrated computation task based on a global scheduler resource load monitoring function and a network monitoring function by utilizing a separate processor such as a hardware accelerator, or an external device such as a cluster or a cloud.

Furthermore, the structure illustrated in FIG. 2 may also be applied to a distributed cloud having a global scheduling function and a global resource management function, and the cloud may include a core cloud and a regional cloud. Furthermore, the structure of the cloud may also be formed in a hybrid cloud form.

Figure 3:
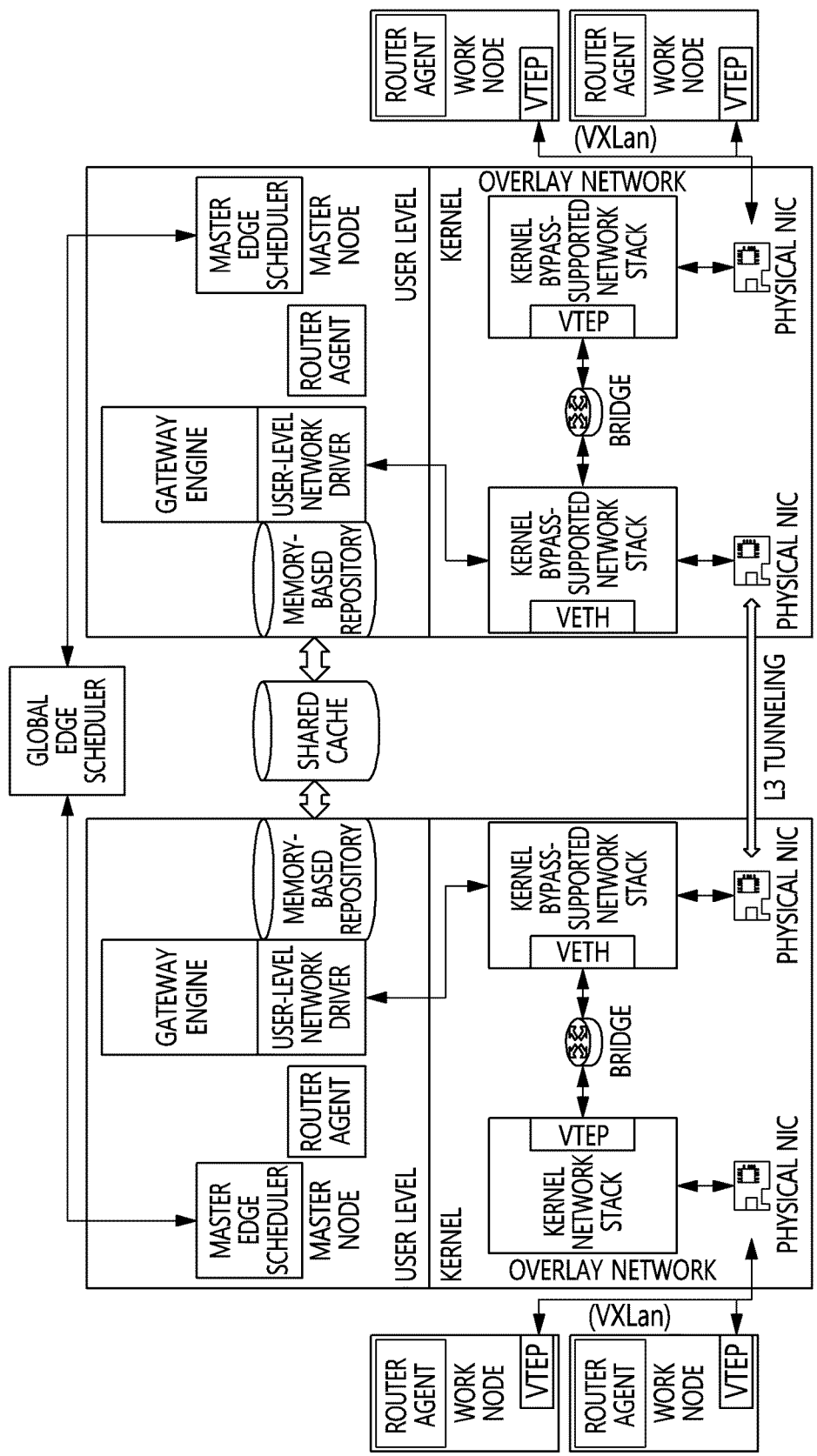
FIG. 3 is a diagram illustrating a service connection structure between clusters for a collaboration service according to an embodiment of the present disclosure.

FIG. 3 is a diagram illustrating a service connection structure between clusters for a collaboration service according to an embodiment of the present disclosure.

Referring to FIG. 3, edge computing may allow an edge computing service to be smoothly provided, and may maximize the efficiency of processing of large-capacity data and a distributed environment.

For this, considerations related to a horizontally distributed environment between cloud edges and a vertically distributed environment between a core cloud and a cloud edge may be essentially required in order to provide a collaboration function for edge computing.

Edge computing requires technology for interconnection between clusters and high-speed distributed deployment in order to allow services applied to the distributed environment to be locally distributed and deployed across the clusters and to be connected to a high-speed network. Therefore, edge computing may include a function of a network connection to multiple cluster nodes of the cloud edge system and interfaces thereof.

Furthermore, edge computing may include a fast data movement (migration) and repository association function, together with the network connection function.

As illustrated in FIG. 3, the service connection structure refers to a network connection function across multiple clusters so as to make a core-edge connection and an edge-edge connection.

The network connection function may interconnect different networks so as to use a near edge attributable to the mobile service of a cloud edge and provide an uninterrupted service.

The cluster according to the present disclosure may provide a high-speed gateway (gateway engine) function to connect multiple clusters to a network and a basic routing (router agent) function for recognition in the clusters. The gateway and the router may perform a management function on the clusters, and may be locally deployed through a global scheduler.

The high-speed gateway is a network connection scheme for connecting and operating multiple clusters at high speed, and may interconnect the clusters through tunneling between two networks.

By means of the effect of tunneling, reliable data transmission may be guaranteed by encapsulating a payload in a tunneling interval and utilizing a specific protocol. Tunneling may be applied to L7, L3, and L2 layers among seven layers of the Internet. As tunneling on a lower-level layer is supported, multiple protocols used on an upper layer may be used without change, and fast performance may be realized. In the present disclosure, two clusters may be interconnected using L3 layer tunneling. In order to improve the processing speed of the protocol used for tunneling in which clusters are connected in this way, a user-level network driver (Data Plane Development Kit: DPDK) for kernel bypass may be used for connection to the tunneling network. Also, an interface between a master node and a worker node may be connected to a tunneling interface through a bridge, and may be connected to a network implemented as an existing overlay network.

A high-speed gateway engine function may perform multi-cluster tunneling in L3 layer that utilizes a user-level network driver.

A global shared cache function may allow high-speed shared storage to be generated based on a network-based storage system that utilizes a memory-based repository, after which data may be shared through interconnection between the high-speed shared storage and a local shared cache. In this case, the global shared cache function may allow the storage in the master node to be utilized as network-based shared storage.

A kernel bypass-supported network stack configuration function may include a library for kernel bypass, device management, and configuration management (e.g., DPDK hardware-supported stack).

A user-level network driver management function may include a CLI function (a network driver provided in an application stage, e.g., Cisco FD.io or the like) of deploying, connecting, and managing a user-level network driver.

A router agent function may be executed in all nodes, may configure a path using endpoint resources synchronized with other clusters, and may activate connections among all clusters. Here, the router agent function may establish the rules of Iptables. The router agent may have a routing table of a gateway engine so as to communicate with the gateway engine in association with the gateway engine.

Figure 4:
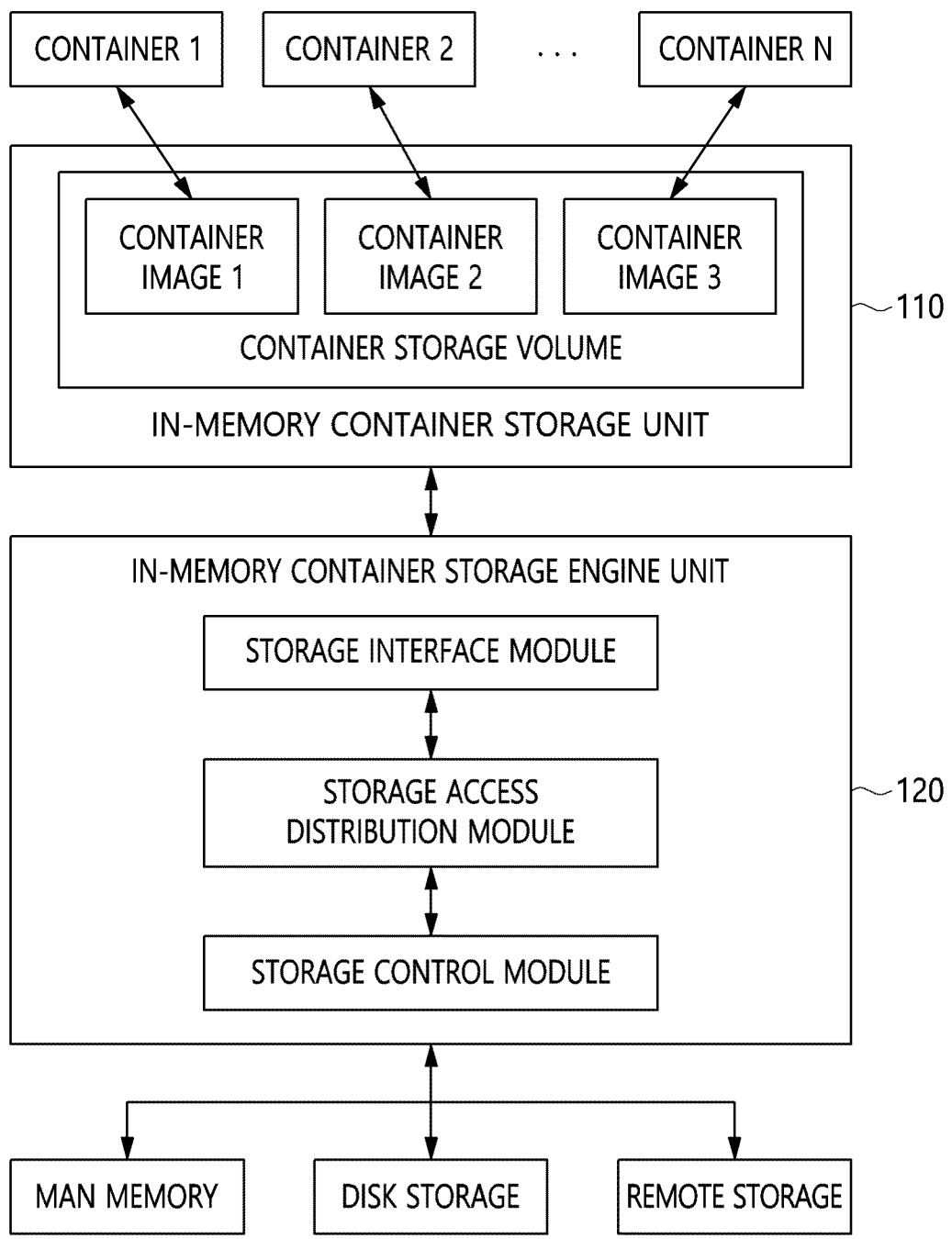
FIGS. 4 and 5 are block diagrams illustrating in-memory-based container storage according to an embodiment of the present disclosure.
Figure 5:
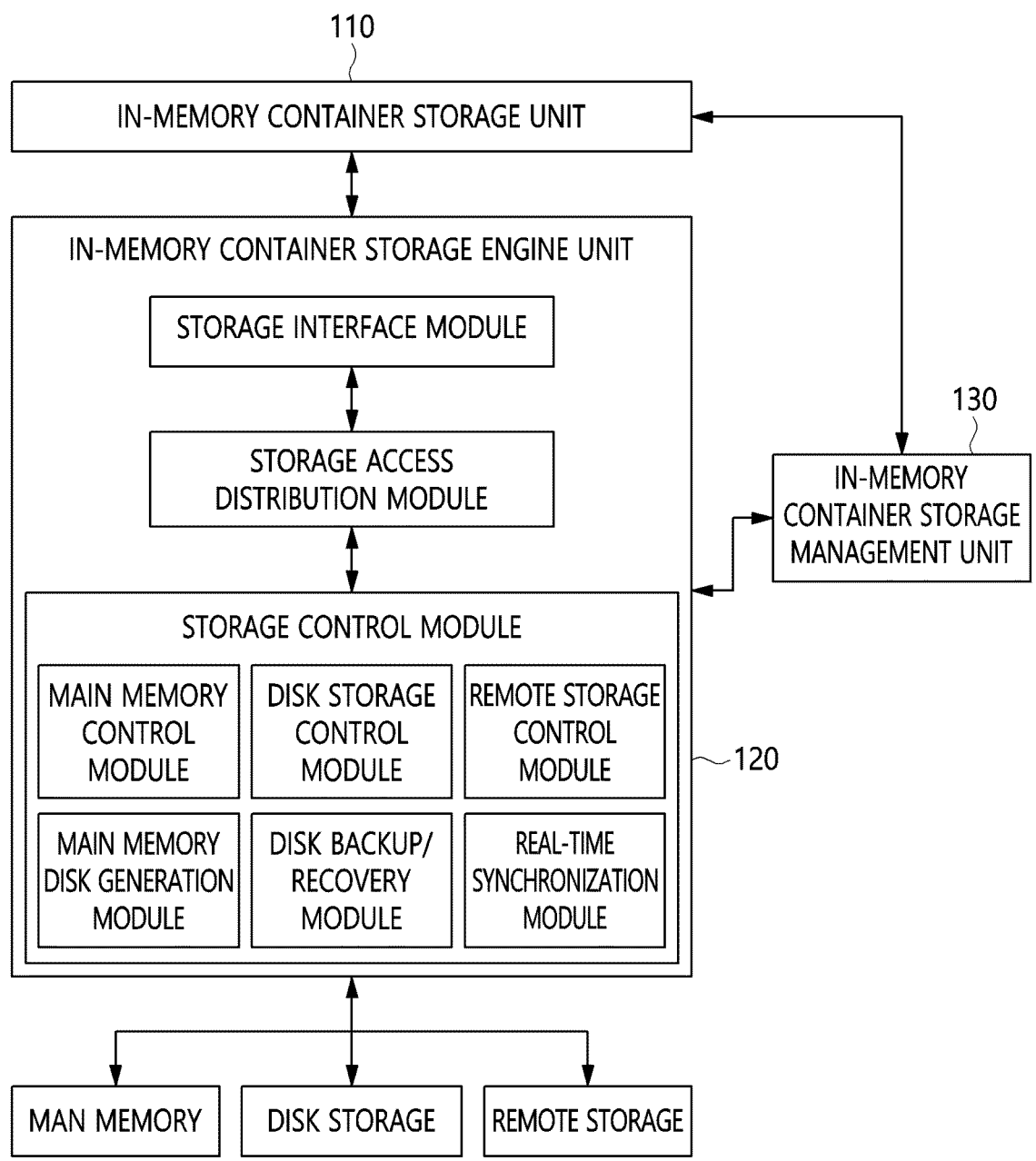

FIGS. 4 and 5 are block diagrams illustrating in-memory-based container storage according to an embodiment of the present disclosure.

Referring to FIGS. 4 and 5, the in-memory-based container storage according to an embodiment of the present disclosure may include an in-memory container storage unit 110, an in-memory container storage engine unit 120, and an in-memory container storage management unit 130.

The in-memory-based container storage according to an embodiment of the present disclosure may correspond to a repository for managing monitoring information configured in each cluster described above.

The in-memory container storage unit 110 may create a container storage volume by generating container images from multiple containers.

Here, the in-memory container storage unit 110 may include storage in main memory having nonvolatile characteristics.

Here, the in-memory container storage unit 110 may create and operate the volume of a file system (example of a docker is /var/lib/docker) in which the container is running.

The in-memory container storage engine unit 120 may generate in-memory container storage, implemented as a container storage volume having a single storage shape, in the in-memory container storage unit 110 by unifying the main memory, disk storage, and remote storage.

In this case, the in-memory container storage engine unit 120 may include a container file system which stores a container for providing application virtualization, and the container file system may include a merged access layer, a container layer, and an image layer.

Here, the container storage volume may be implemented as a container file system which includes the merged access layer, the container layer, and the image layer, and in which integrated processing of individual layers is performed using a unifying-file system function.

Here, the container file system may perform integrated processing of the layers using the unifying-file system function.

Here, the unifying-file system function may be configured to mount a user directory and related directories that are included in the layers of the container file system and to perform integrated processing on the user directory and the related directories.

Here, the image layer may include lower directories in which the link information is stored.

Here, the container layer may store difference information about modification details of the image layer depending on the user's access.

In this case, the merged access layer may include the user directory which allows the user to access the link information of the image layer through the container layer and receive a file requested by the user to be shared.

Here, the in-memory container storage unit 110 may provide a standard block storage interface, and may operate the same without separate modification.

The in-memory container storage unit 110 may receive a container access command issued by the container.

The in-memory container storage engine unit 120 may generate single shape in-memory container storage by unifying the main memory, the disk storage, and the remote storage.

The in-memory container storage engine unit 120 may process a disk access command by utilizing the main memory, the disk storage, and the remote storage in an integrated manner.

The in-memory container storage engine unit 120 may include a storage interface module, a storage access distribution module, and a storage control module.

The storage interface module may provide a standard block storage-type interface, and may receive the disk access command issued by the container. The received command may be transferred to the storage access distribution module.

The storage access distribution module may determine whether a service is to be performed using the main memory storage, the disk storage or the remote storage depending on the features of the disk access command, and may transfer the corresponding access command to a main memory control module, a disk storage control module, and a remote storage control module.

The main memory control module may process the disk access command using the main memory, whereby a high data access speed may be provided.

A main memory disk generation module may perform actual read/write operations on the main memory that is accessible on an address basis in response to disk access commands that are transmitted on a block basis. By means of this operation, the main memory disk generation module may store data, present in a virtual disk, in the main memory.

The disk storage control module may process a virtual desk access command using the disk storage.

The in-memory container storage management unit 130 may provide shared data to the user.

Here, the in-memory container storage management unit 130 may provide a sharing management function of the shared storage through a container file system layer management module, and may individually configure an area for file sharing and provide the area to the user.

Here, the in-memory container storage management unit 130 may provide link information of files in the container layer and the image layer to an application and allow the application to access the files in response to the request of the user.

Figure 6:
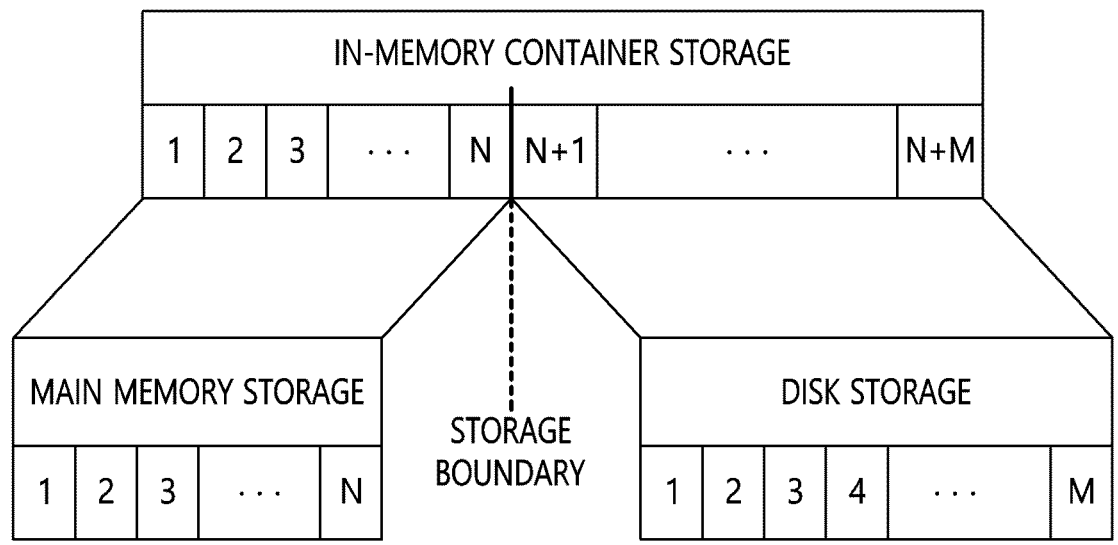
FIG. 6 is a diagram illustrating a process of generating in-memory container storage according to an embodiment of the present disclosure.

FIG. 6 is a diagram illustrating a process of generating in-memory container storage according to an embodiment of the present disclosure.

Referring to FIG. 6, a process of generating single hybrid-type in-memory storage by unifying main memory storage and disk storage is illustrated. The in-memory container storage may provide a standard block storage format, and may be generated by mapping the area of the main memory storage to the first part of the storage and by mapping the area of the disk storage to the latter part of the storage.

The block IDs 1 to N of the main memory storage are mapped to the block IDs 1 to N of the in-memory container storage. The block IDs 1 to M of the disk storage are mapped to the block IDs N+1 to N+M of the in-memory container storage. Further, a storage boundary may be established between the block IDs N and N+1 of the in-memory container storage.

Figure 7:
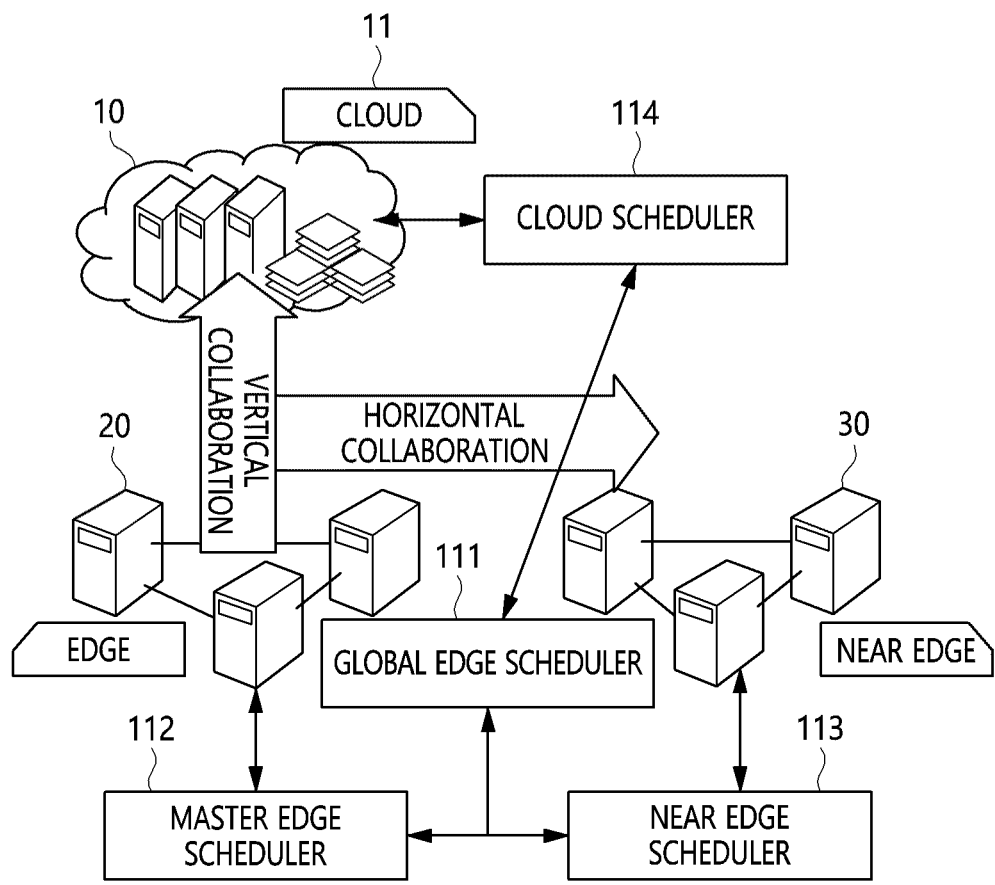
FIG. 7 is a diagram illustrating schedulers of an edge service system according to an embodiment of the present disclosure.

FIG. 7 is a diagram illustrating schedulers of an edge service system according to an embodiment of the present disclosure.

Referring to FIG. 7, the schedulers of the edge service system according to an embodiment of the present disclosure are depicted.

The schedulers according to the embodiment of the present disclosure may include a scheduler that can dynamically establish a policy, an intelligent scheduler based on analysis of log data, and schedulers which can minimize costs attributable to the change of a scheduling policy and minimize waiting time and latency.

A work target for the schedulers according to an embodiment of the present disclosure may include a resident container for executing a monolithic application or a microservice, and a non-resident container for executing a Function as a Service (FaaS).

The schedulers according to an embodiment of the present disclosure may include four types of schedulers including the global edge scheduler 111 corresponding to the above-described 3 Locations, and three types of types of schedulers 112, 113, and 114, as illustrated in FIG. 7.

The global edge scheduler 111 may correspond to a scheduler for operating in conjunction with a master edge scheduler 112, a near edge scheduler 113, and a cloud scheduler 114, and may also correspond to a global scheduler 110 included in the intelligent scheduler 100.

The master edge scheduler 112 may correspond to a scheduler included in an edge (master edge) system 20 in which a main service is executed.

The near edge scheduler 113 may correspond to a scheduler included in the near-edge system 30 present near the master edge.

The cloud scheduler 114 may correspond to a scheduler included in a public/private cloud 11.

Figure 8:
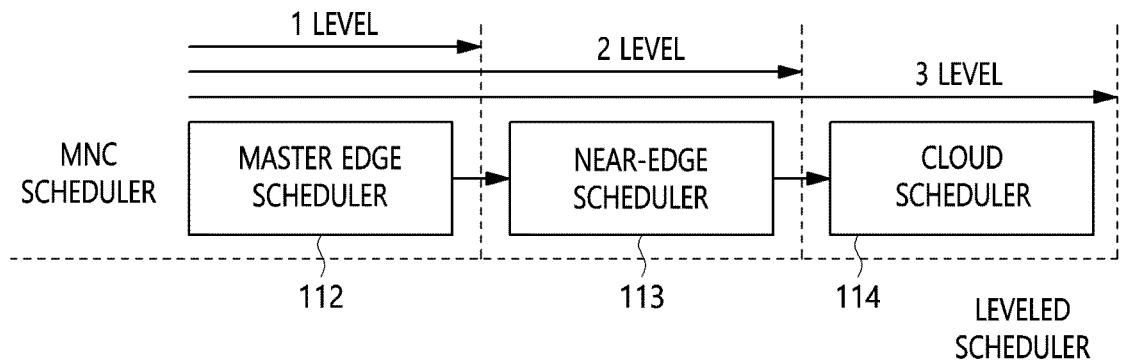
FIG. 8 is a diagram illustrating an example in which schedulers of the edge service system illustrated in FIG. 7 are implemented as a leveled scheduler.

FIG. 8 is a diagram illustrating an example in which the schedulers of the edge service system illustrated in FIG. 7 are implemented as a leveled scheduler.

Horizontal/vertical collaboration may be applied to an edge service for configuring schedulers according to an embodiment of the present disclosure at the system level. For this operation, schedulers according to the embodiment of the present disclosure may provide series-connection configuration, such a leveled scheduler, and a parallel-connection configuration, such as a shared scheduler. The leveled scheduler may have a series-connection configuration for sequential processing of schedulers, and the shared scheduler may have a parallel-connection configuration in which schedulers contend with each other to find an optimal condition.

Referring to FIG. 8, an example of configuration of the leveled scheduler is illustrated, wherein a 3-leveled scheduler having a series-connection configuration in which schedulers are connected in series in the order of a master edge scheduler 112, a near edge scheduler 113, and a cloud scheduler 114 is depicted.

For example, when allocation of resources by the master edge scheduler 112 corresponding to a first level succeeds, the global edge scheduler 111 may skip the execution of second and third level schedulers. However, when the allocation of resources by the master edge scheduler 112 corresponding to the first level fails, the global edge scheduler 111 may sequentially transfer tasks (work) to the near edge scheduler 113 that is a second level scheduler corresponding to a subsequent level or to a cloud scheduler 114 that is a third level scheduler. A service developer may apply edge service load balancing and collaboration between services at the system level using the leveled scheduler.

Figure 9:
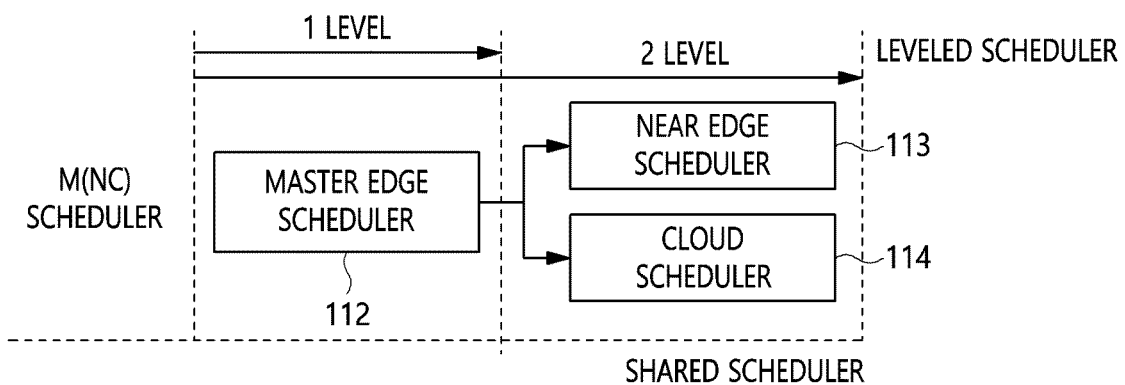
FIG. 9 is a diagram illustrating in detail an example of a complex configuration in which the schedulers of the edge service system illustrated in FIG. 7 are combined with a leveled scheduler and a shared scheduler.

FIG. 9 is a diagram illustrating in detail an example in which the schedulers of the edge service system illustrated in FIG. 7 are implemented in a complex configuration in which a leveled scheduler and a shared scheduler are combined with each other.

Referring to FIG. 9, a complex configuration in which the leveled scheduler and the shared scheduler are combined with each other is illustrated.

Here, it can be seen that the leveled scheduler is configured in a 2-level structure while a shared scheduler is configured between a near edge scheduler 113 and a cloud scheduler 114 at a second level.

The shared scheduler may simultaneously request a task from two or more schedulers, may receive candidates from respective schedulers, and may select an optimal scheduler from among the schedulers based on the candidates.

For example, when the allocation of resources by the master edge scheduler 112, corresponding to a first level, fails, the global edge scheduler 111 may allow the near edge scheduler 113 and the cloud scheduler 114 to simultaneously request a task at a second level scheduler in a contention mode, may receive candidates from respective schedulers, and may select an optimal scheduler from among the schedulers based on the candidates.

Figure 10:
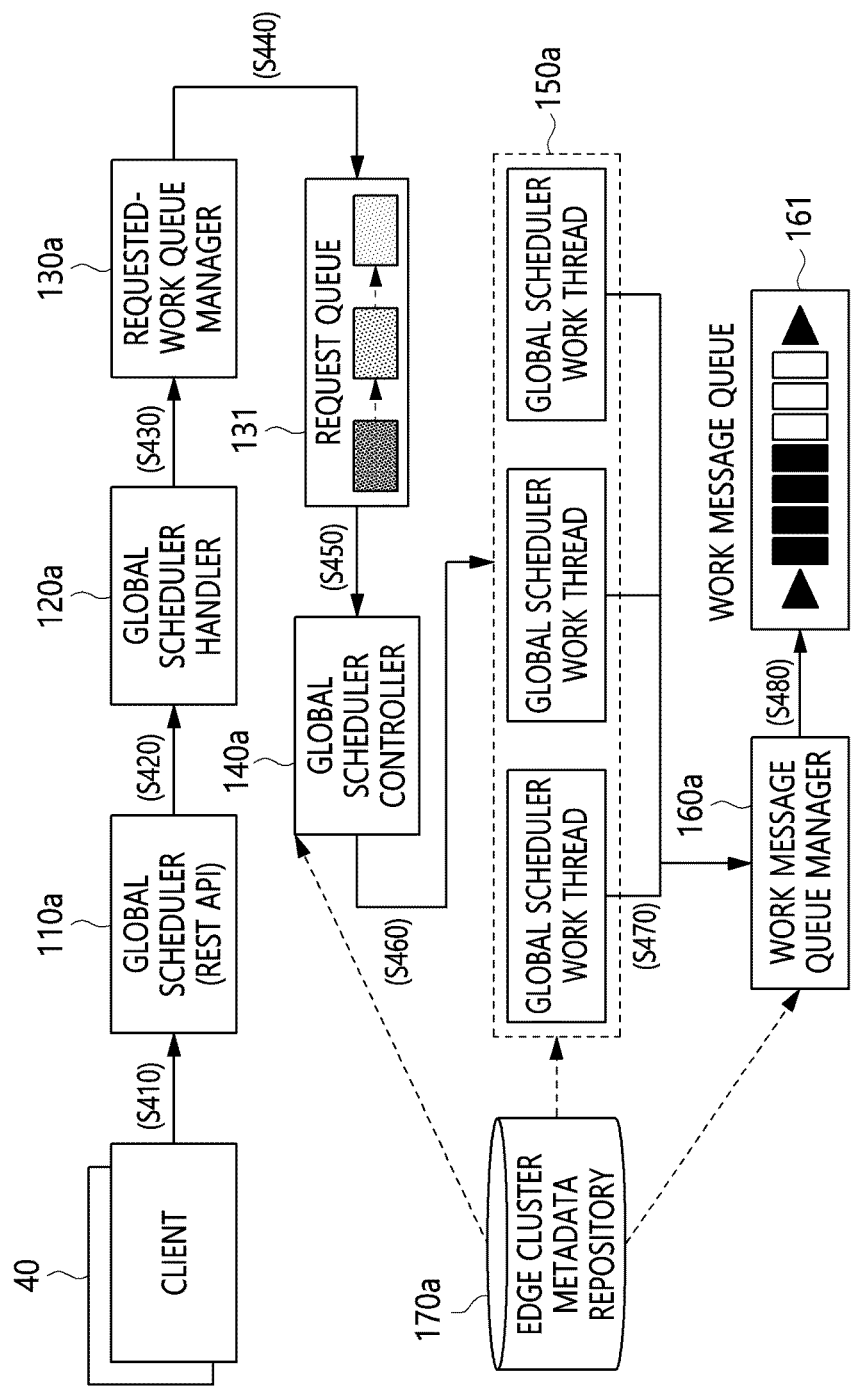
FIG. 10 is a block diagram illustrating the processing flow of an intelligent scheduler according to an embodiment of the present disclosure.
Figure 11:
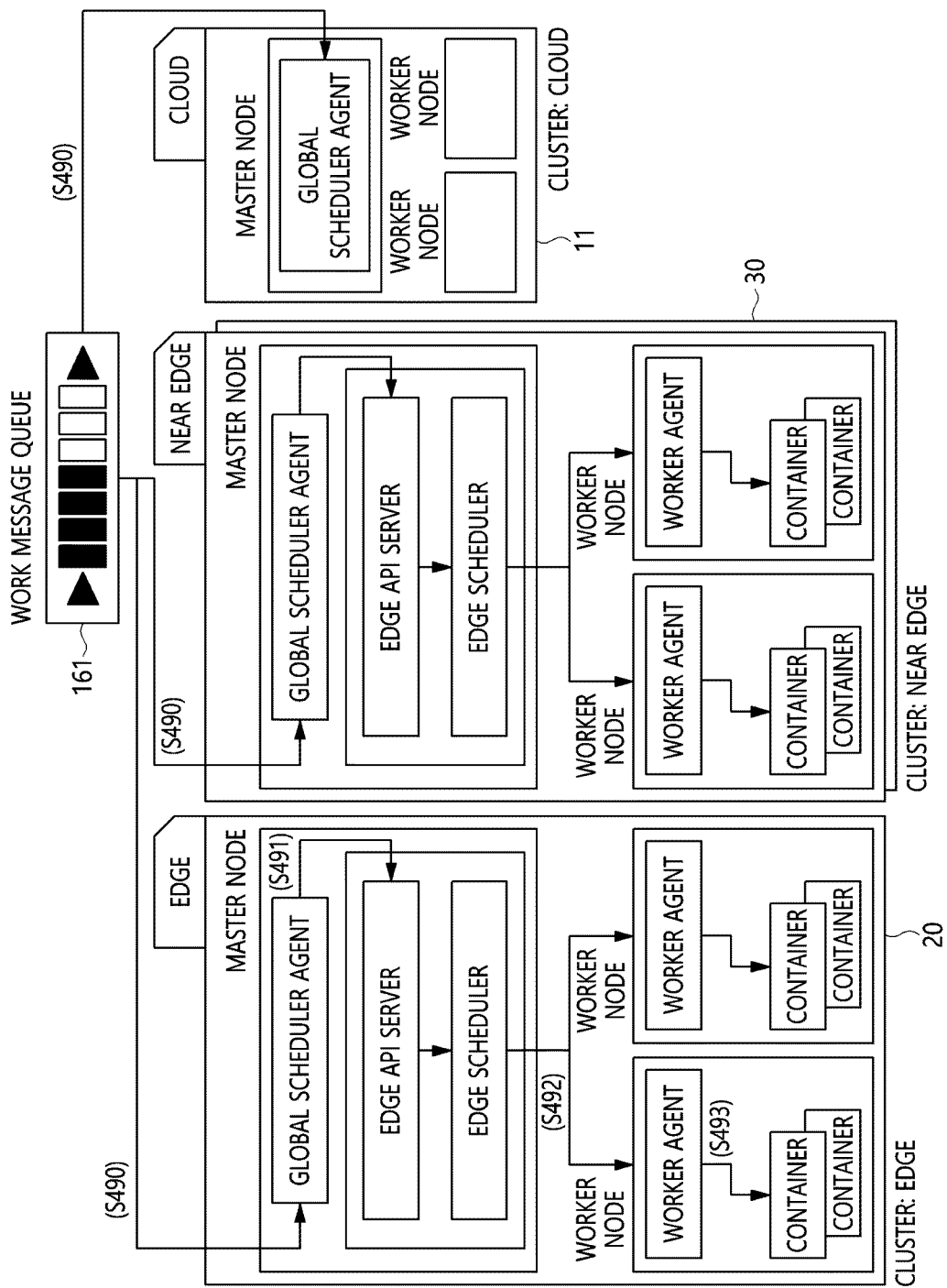
FIG. 11 is a block diagram illustrating the processing flow of an edge, a near edge, and a cloud, continued from the processing flow of the intelligent scheduler illustrated in FIG. 10.

FIG. 10 is a block diagram illustrating the processing flow of an intelligent scheduler according to an embodiment of the present disclosure, and FIG. 11 is a block diagram illustrating the processing flow of an edge, a near edge, and a cloud, continued from the processing flow of the intelligent scheduler illustrated in FIG. 10.

Referring to FIG. 10, a container requested by a client 40 may be created and run in a worker node at step S410.

That is, at step S410, a client 40 may make a REST API call corresponding to container creation to a global scheduler 110a.

Next, at step S420, the global scheduler 110a may execute a global scheduler handler 120a corresponding to the called REST API.

At step S430, a global scheduler handler 120a may transmit the requested data to the requested-work queue manager 130a.

At step S440, the requested-work queue manager 130a may store the requested data in the request queue 131.

At step S450, the global scheduler controller 140a may fetch data to be processed in consideration of priority from the request queue 131.

At step S460, the global scheduler controller 140a may generate multiple work threads in the global scheduler work thread 150a, may transfer the data to be processed to the global scheduler work thread 150a, and may then execute work queue scheduling.

At step S470, the global scheduler work thread 150a may analyze each requested task, and may send a message to be requested form the corresponding cluster 10, 20 or 30 to the work message queue manager 160a.

At step S480, the work message queue manager 160a may store the received message in a work message queue 161.

Referring to FIG. 11, at step S490, the global scheduler agent may check whether any message corresponding to an edge system 20 or a near-edge system 30 is present in the work message queue 161, and may fetch the corresponding message.

At step S491, the global scheduler agent may analyze the fetched message, and may make the corresponding API call to the edge API server thereof.

At steps S492 and S493, the edge scheduler may create and run the requested container through worker agents present in worker nodes.

Figure 12:
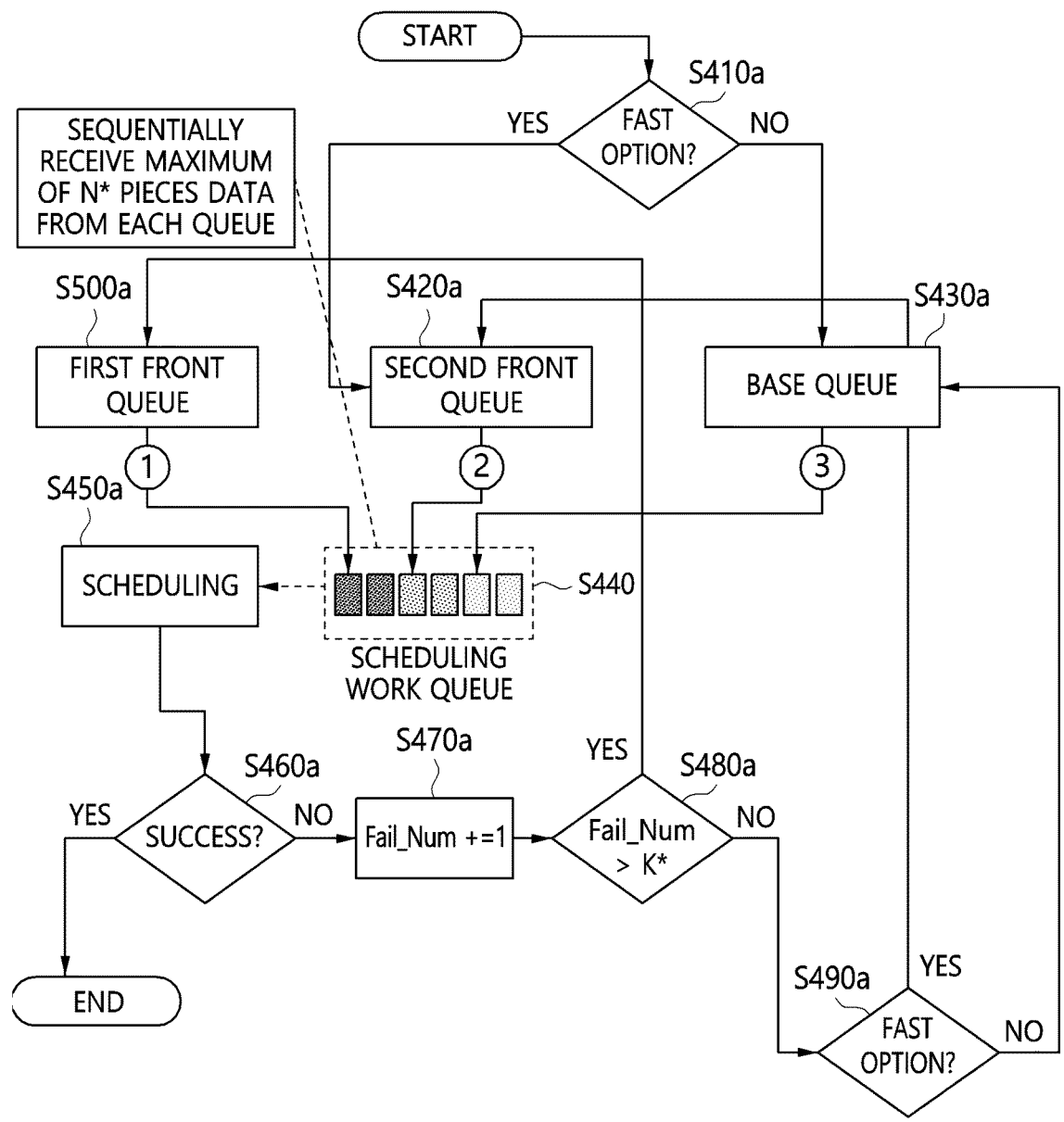
FIG. 12 is an operation flowchart illustrating in detail an example of the work queue scheduling step illustrated in FIG. 11.

FIG. 12 is an operation flowchart illustrating in detail an example of the work queue scheduling step illustrated in FIG. 11.

Referring to FIG. 12, at steps S460 to S480 illustrated in FIG. 11, at the work queue scheduling step, scheduling of tasks (work) has been requested by the work message queue 161, but a sub-step of processing requests by dividing the work message queue 161 into three stages in order to primarily process the task for a request that has repeatedly failed and to process a request having a priority option in preference to a basic scheduling request is illustrated.

The 3-step work message queue 161 may include a first front queue, a second front queue, and a base queue.

The first front queue may be a queue for primarily processing a request that has repeatedly failed.

A second front queue may be a queue to be processed with higher priority than that of a basic scheduling request.

Processing of the 3-step work queue by an edge scheduler policy runner may be performed based on the following rules.

First, at step S410a, it may be checked whether priority option (FAST option) is present in the requested data, when it is checked that there is a priority option, data may be stored in the second front queue at step S420a, and when there is no priority option, the data may be stored in a base queue at step S430a.

At step S440a, the data stored in the first front queue, the second front queue, and the base queue may be stored in the work message queue 161.

At step S450a, whether pieces of data are present in the queues in the order of the first front queue, the second front queue, and the base queue may be checked, and a preset number (N*) of tasks may be sequentially generated from each queue in a scheduling work queue, and thus the scheduling task (work) may be processed.

At step S460a, when scheduling succeeds, the work queue processing procedure may be terminated, whereas when scheduling fails, the number of failures in each request (Fail_Num) may be increased by 1 at step S470a. Whether the number of failures is equal to or greater than the preset number of failures (K*) may be determined at step S480a. When the number of failures is equal to or greater than the preset number of failures (K*), the data may be stored in the first front queue at step S500a.

Here, at step S480a, when the number of failures is less than the preset number of failures (K*), and a priority option is present, data may be stored in the second front queue at step S420a. When there is no priority option, data may be stored in the base queue at step S430a.

The work queue scheduling step of the work queue illustrated in FIG. 12 may be repeated until all request data remaining in the 3-step work queue is processed, and the work queue may wait for request data when there is no data.

Figure 13:
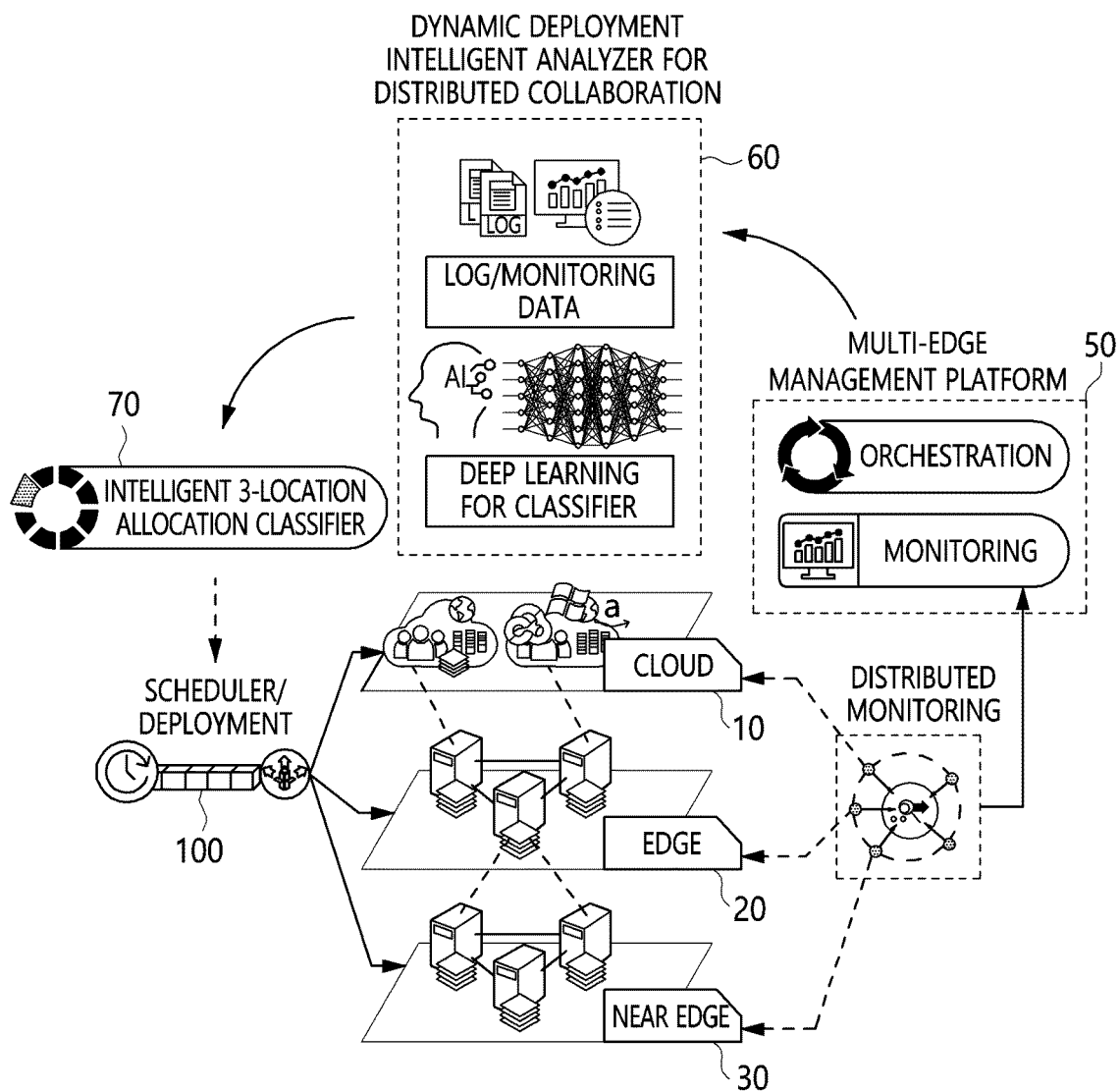
FIG. 13 is a diagram illustrating dynamic deployment for distributed collaboration between services based on an intelligent scheduler according to an embodiment of the present disclosure.

FIG. 13 is a diagram illustrating dynamic deployment for distributed collaboration between services based on an intelligent scheduler according to an embodiment of the present disclosure.

Referring to FIG. 13, schedulers of the intelligent scheduler 100 according to an embodiment of the present disclosure may be provided as intelligent schedulers other than fixed schedulers.

The intelligent scheduler 100 according to an embodiment of the present disclosure may further include an intelligent analyzer 180 which collects real-time monitoring data and logs for a cloud 11, an edge system 20, and a near-edge system 30, and may dynamically deploy various services from the collected data using the intelligent scheduler through AI analysis such as deep learning.

The intelligent analyzer 180 may need a large amount of history data when deriving an intelligent scheduler policy through artificial intelligence training.

Here, the intelligent analyzer 180 may construct an edge service system, and may not immediately perform artificial intelligence training, but may train an edge scheduler policy after the history data has been collected for a predetermined period of time.

Figure 14:
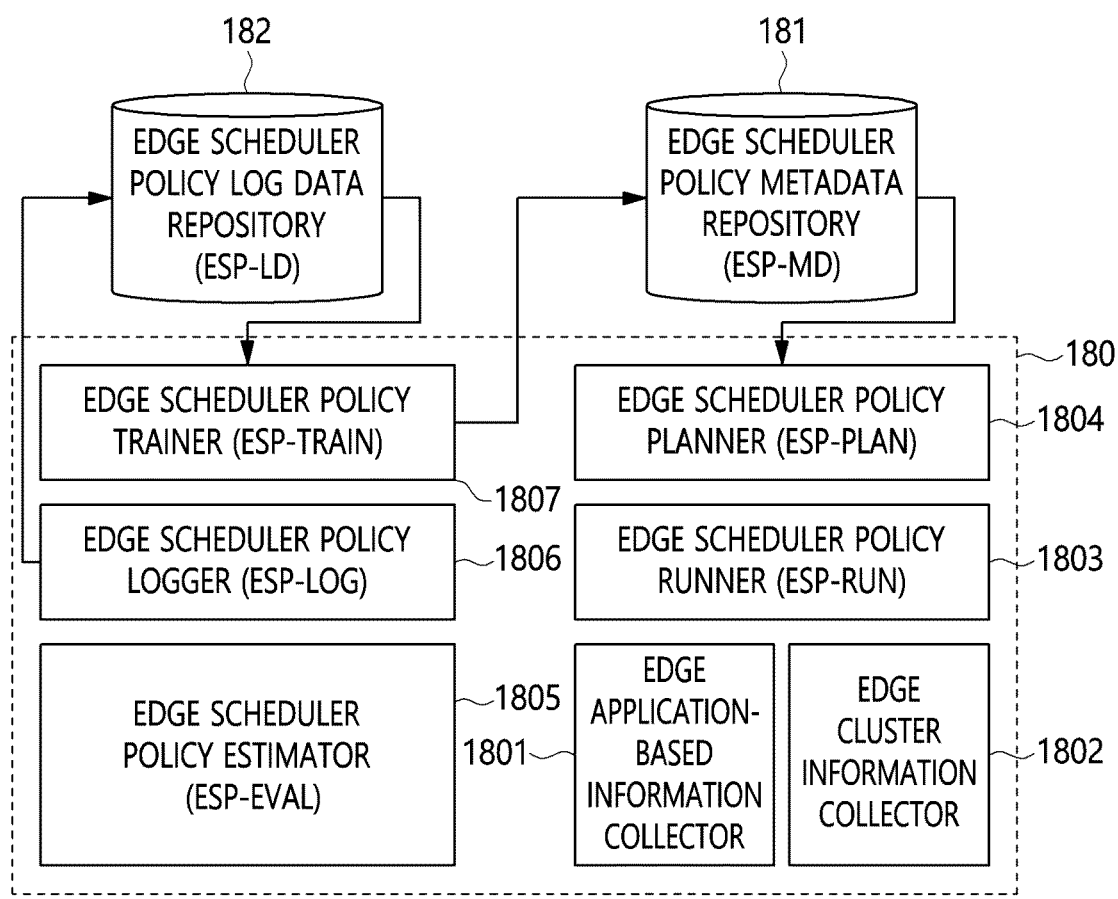
FIG. 14 is a block diagram illustrating an intelligent scheduler including an intelligent analyzer according to an embodiment of the present disclosure.

FIG. 14 is a block diagram illustrating an intelligent scheduler including an intelligent analyzer according to an embodiment of the present disclosure.

Referring to FIG. 14, the intelligence analyzer 180 included in the intelligent scheduler according to an embodiment of the present disclosure is illustrated in detail.

The intelligent analyzer 180 may include an edge application-based information collector 1801, an edge cluster information collector 1802, an edge scheduler policy runner 1803, an edge scheduler policy planner 1804, an edge scheduler policy estimator 1805, an edge scheduler policy logger 1806, and an edge scheduler policy trainer 1807.

The intelligent analyzer 180 may store metadata and scheduler policy logs in an edge scheduler policy metadata repository 181 and an edge scheduler policy log data repository 182.

The edge scheduler policy metadata repository 181 may store edge scheduler policies (ESP).

The edge scheduler policy log data repository 182 may store the results of applying each edge scheduler policy through the edge scheduler policy logger.

The edge application-based information collector 1801 may collect resource information, such as a response speed, an actual CPU use rate, an actual memory use rate, and other resource usage status, for each application run by an edge.

The edge cluster information collector 1802 may collect resource information, such as an actual CPU use rate and an actual memory use rate, for each of physical nodes constituting a cluster.

The edge scheduler policy runner 1803 may run the best policy by applying various edge scheduler policies and then evaluating the edge scheduler policies depending on the degree of optimization.

The edge scheduler policy planner 1804 may establish a plan for running the policy based on the information collected by the edge application-based information collector 1801 and the edge cluster information collector 1802.

The edge scheduler policy evaluator 1805 may evaluate the edge scheduler policies and then evaluate the scheduler policies depending on the degree of optimization.

The edge scheduler policy logger 1806 may store the run scheduler policies and the results of running the scheduler policies in the form of logs.

The edge scheduler policy trainer 1807 may fetch history data from the edge scheduler policy log data repository 182, and may then train the corresponding scheduler policy.

Figure 15:
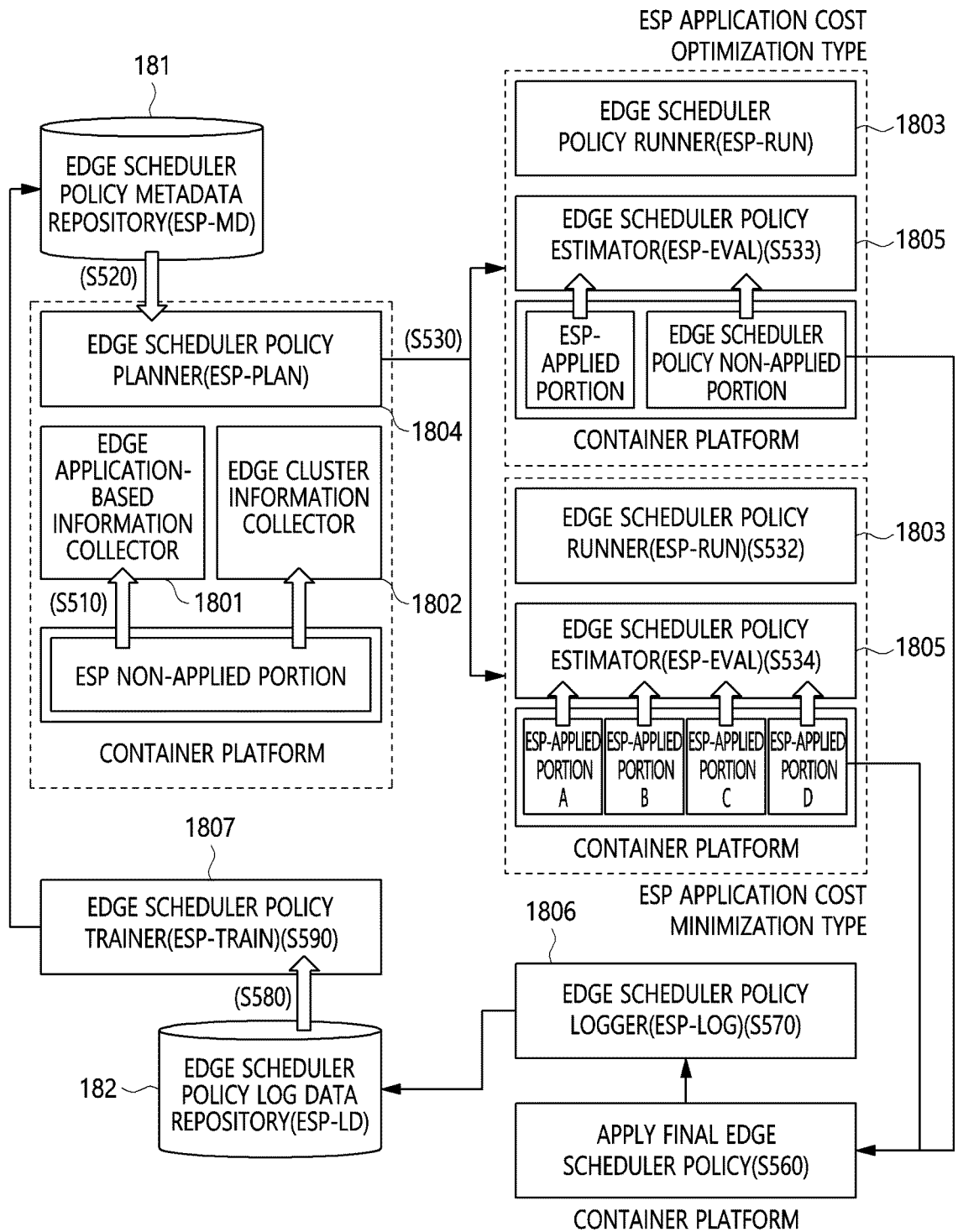
FIG. 15 is a block diagram illustrating the optimized flow of an intelligent scheduler according to an embodiment of the present disclosure.

FIG. 15 is a block diagram illustrating the optimized flow of an intelligent scheduler according to an embodiment of the present disclosure.

Referring to FIG. 15, the key point of intelligent scheduling is to provide both a method for optimizing scheduling at minimum cost and a method for optimizing scheduling at maximum speed.

First, at step S510a, information of a container platform may be collected through the edge application-based information collector 1801 and the edge cluster information collector 1802.

At step S520a, the edge scheduler policy planner 1804 may select a policy from the edge scheduler policy metadata repository 181 based on the information collected at step S510a.

At step S530a, one of an ESP application cost minimization type and an ESP application optimization type may be selected based on resource information identical to the load degree of the container platform.

Step S531 may correspond to an ESP-applied cost minimization type, wherein containers may be allocated through the edge scheduler policy executer 1803.

Step S533 may correspond to an ESP-application optimization type, where the scheduler policy may be evaluated through a relative comparison between the state before the edge scheduler policy is applied and the state after the edge scheduler policy has been applied.

Step S532 may correspond to an ESP-applied optimization type, where containers may be allocated through the edge scheduler policy executer 1803.

Step S534 may correspond to an ESP-application cost minimization type, where the scheduler policy may be evaluated through a relative comparison between the state before the edge scheduler policy is applied and the state after the edge scheduler policy has been applied.

Step S560 may be applied to all schedulers so that there are no portions to which the finally selected edge scheduler policy is not applied.

At step S570, the results of evaluating the scheduler policies may be stored in the edge scheduler policy log data repository 182 through the edge scheduler policy logger 1806.

At step S580, the edge scheduler policy trainer 1807 may collect the edge scheduler policy log data stored in the edge scheduler policy log data repository 182.

At step S590, the edge scheduler policy trainer 1807 may generate an optimized intelligent scheduler policy by performing scheduler policy training.

Figure 16:
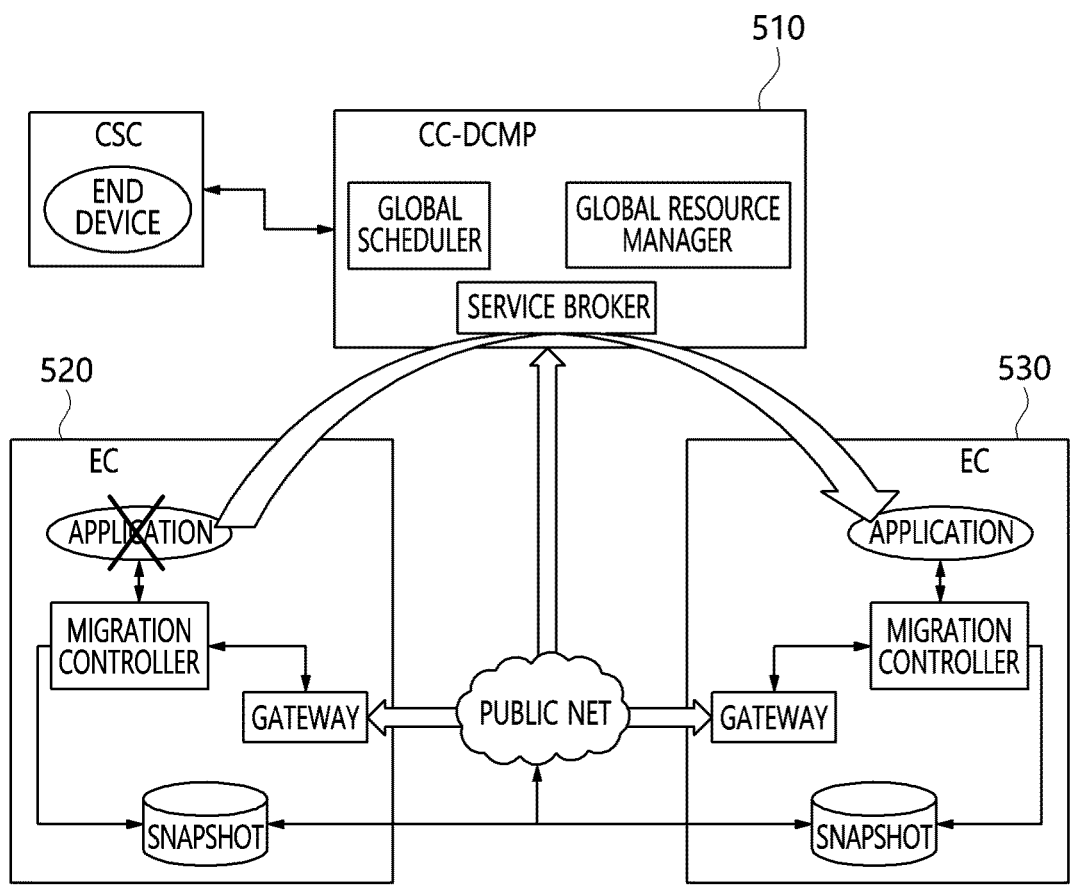
FIG. 16 is a diagram illustrating service migration for risk management in a distributed cloud system according to an embodiment of the present disclosure.

FIG. 16 is a diagram illustrating service migration for risk management in a distributed cloud system according to an embodiment of the present disclosure.

Referring to FIG. 16, a migration service in the distributed cloud system may be provided to redeploy services in real time and maintain continuous services. In consideration of resource scarcity, failures, and cost-effectiveness, migration between edge clouds or between each edge cloud and another cloud may be performed.

The distributed cloud system may receive user requests for each edge cloud to control the distributed cloud system.

Here, the distributed cloud system may cloud a core cloud including large-scale resources, the edge cloud, and a local cloud including middle-scale resources between the core cloud and the edge cloud.

Here, the distributed cloud system may process tasks corresponding to the user requests, distribute the tasks based on a queue, and aggregate the results of the tasks that have been processed.

Here, the distributed cloud system may execute commands including the provision of processed data in response to the user requests.

Here, the commands may be used to perform a function of managing failure when failure in the distributed cloud system occurs.

The management function may include data movement (migration) control between edge clouds including the corresponding edge cloud.

The movement control may be performed to check the state of the edge cloud and store the current state of a snapshot image.

Here, the distributed cloud system may reduce snapshot transmission between the edge clouds using memory.

Here, the distributed cloud system may perform migration of storing the snapshot image in a checkpoint repository corresponding to the shared storage of the edge clouds.

Further, the edge clouds may provide an uninterrupted service even for a proximity service between the edge clouds for supporting the most important mobility service. Therefore, the distributed cloud system and the data processing method of the distributed cloud system may provide a container- or virtual machine-based application migration function as the way to overcome failure in the distributed cloud.

The cloud computing provider of the distributed cloud (CC-DCMP) 510 may provide a global scheduling function and a global resource management function.

In order to perform the migration function, the cloud computing provider 510 may manage functions of migration between clusters and migration between different clouds to perform service migration between multiple clusters, as well as a single cluster. This function may be performed by a service broker, and the states of respective services may be transmitted to a target application.

Here, edge computing systems 520 and 530, which are service migration provision devices, may capture the state of the application in a transmittable format in real time, and may store the state of the application in the form of a snapshot.

Basically, in global management for the distributed cloud, a scheduler may allocate an application to a node through a Distributed Cloud Management Platform (DCMP), and a controller may create, delete or update the application while communicating with the node through a gateway. Here, the gateway may take charge of a control function of connecting networks between the clusters to each other.

The maintenance of the application may be performed at each node, and only a control task of creating containers or virtual machines may be performed by individual agents residing on a target node itself.

Each of the edge computing systems 520 and 530 may provide the overall migration function through a migration controller.

When there are snapshots (checkpoint images) for maintaining the state of the application, the edge computing systems 520 and 530 may transmit the snapshots between the nodes.

For this operation, the edge computing systems 520 and 530 may provide a storage function including a fast data sharing function. Therefore, the edge computing systems 520 and 530 may utilize a shared fast storage mechanism and utilize a high-speed network connection in an orchestration layer so as to reduce data transmission between a node and pod.

Migration for system failure may be provided by a Cloud Service Provider (CSP).

Migration may include service migration and application migration.

Application migration may include a control process of checking the state of the corresponding application on an edge controller (EC), verify the network of a target node, store the current state of the application as a snapshot image, and restore an image at a restoration location.

Service migration may include a function of connecting a previous node and an IP address thereof to a destination node and an IP address thereof to which the service is migrated, through a proxy service.

The CSP may provide network connections using additional cloud resources for service migration.

Network connections may include a high-speed connection method performed through a gateway for a connection between distributed clouds.

The high-speed connection method may include dedicated and direct network connections using tunneling such as IPsec tunneling, or path bypassing through network proxies.

Each cloud may be implemented using a single cluster or multiple clusters.

The CSP may provide data management for service migration.

Data management for service migration may reduce the transmission of snapshots (e.g., checkpoints) between nodes using shared high-speed storage or a cache mechanism.

Data management for service migration may include data management and data storage deployment using a microservice and virtual machines.

In the case of load balancing, system failures, and Cloud Service Customer (CSC) policies, the DCMP may search for CSC applications and data, and may migrate the corresponding service to available resources of the distributed cloud.

Figure 17:
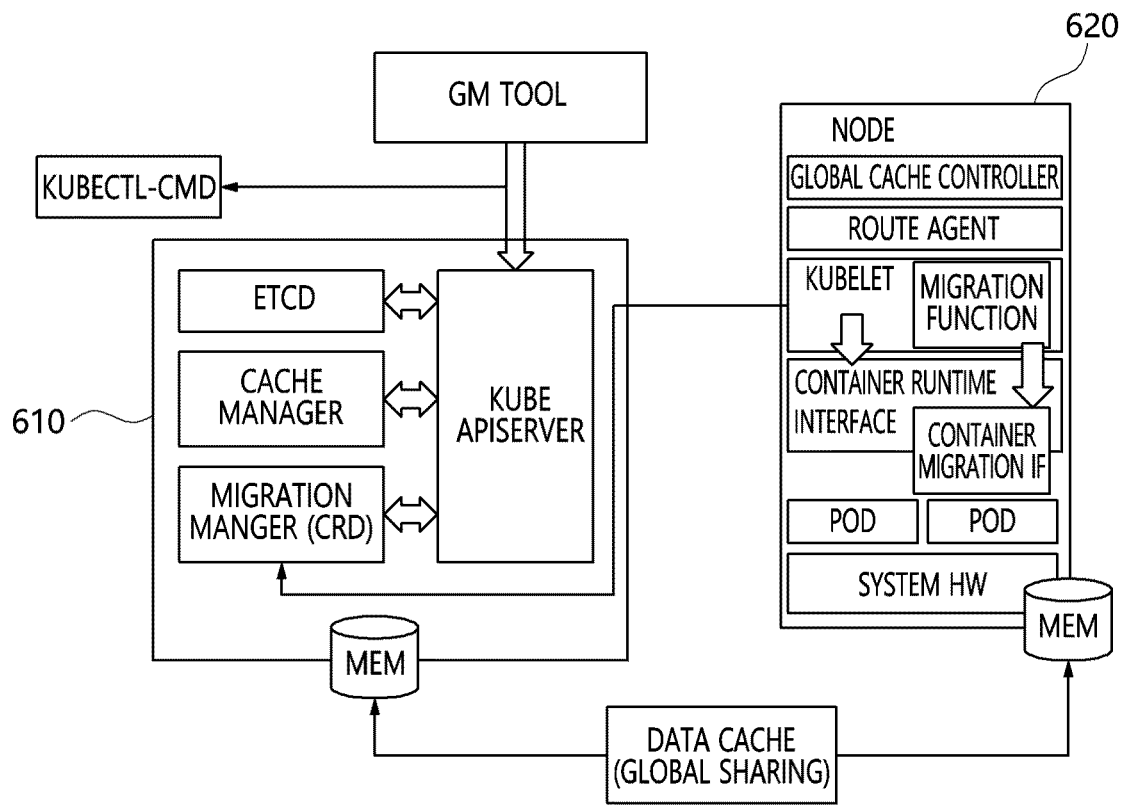
FIG. 17 is a block diagram illustrating a cloud service migration device of a distributed cloud system according to an embodiment of the present disclosure.

FIG. 17 is a block diagram illustrating a cloud service migration device of a distributed cloud system according to an embodiment of the present disclosure.

Referring to FIG. 17, the cloud service migration device 610 of the distributed cloud system according to the embodiment of the present disclosure may stably capture the state of each container in a transmittable format in real time.

A pod may be a single container or may be composed of multiple containers. The state of each container may be transmitted from a source pod to a destination pod.

The cloud service migration device 610 may create and unify container-based APIs using a Checkpoint Restore in Userspace (CRIU) as a container migration interface.

The CRIU is a software tool for a Linux Operating System (OS). Using this tool, it is possible to stop a running application and checkpoint it to permanent storage as a collection of files.

Basically in a container-based platform (K8s), the pod is adjusted by the process of a node 620.

Therefore, the cloud service migration device 610 may allocate a pod to the node 620, and a duplication controller may create, delete or update the pod while communicating with a suitable node.

The node 620 may perform a control task of maintaining the pod and creating a container through a migration agent.

The cloud service migration device 610 may perform migration through K8S CustomResourceDefinitions (CRD) in which a migration function is predefined (EC capability Enabler—Migration Manager).

CRD takes charge of a control function of managing migration in association with the management function of the K8S.

As illustrated in FIG. 17, the cloud service migration device 610 of the distributed cloud system may call an offloading controller (EC Capability operation—Migration agent) residing on the node 620 through the API of the K8S.

When there is a container checkpoint image of the pod, a mechanism for transmitting data of the image between nodes is required. In current Kubernetes, a current unique example of data communication between nodes enables only a redeployment task to be performed by means of the transmission of configuration data such as a pod template. Further, the node 620 does not communicate with other nodes in the current orchestration layer. This becomes large obstruction to data and service migration for real-time uninterrupted services. Therefore, the cloud service migration device 610 may utilize the mechanism of the shared storage to reduce data transmission between the node and the pod, and may also utilize a network connection function in the orchestration layer.

For the purpose of service migration using the shared storage, the cloud service migration device 610 may check the pod state of the migration target node 620 on the edge cloud through an offloading controller, and may extract the pod state.

Here, the cloud service migration device 610 may check the states of all containers in consideration of the order of dependency between the containers in the source pod/node.

The cloud service migration device 610 may provide a checkpoint creation call function.

In this case, the cloud service migration device 610 may dump live image files of the containers included in the pod, and may then generate snapshots thereof.

The cloud service migration device 610 may provide a function of transmitting checkpoint images and pod states.

In this case, the cloud service migration device 610 may transmit the snapshots to a checkpoint repository corresponding to the shared storage of the edge cloud. The checkpoint repository may provide an additional management function so as to easily search for and process files (in association with a data management and deployment management function).

The cloud service migration device 610 may check network connection to a remote target node.

The cloud service migration device 610 may provide a function of checking and monitoring checkpoint states.

Here, the cloud service migration device 610 may monitor the state information of the checkpoint repository.

The cloud service migration device 610 may provide a checkpoint time point restoration call function.

Here, the cloud service migration device 610 may call the restoration function of each container in consideration of the dependency order of the containers from the snapshots and container state files.

Here, the cloud service migration device 610 may perform examination for an application state in the edge, network examination of a migratable node, storage of the current state of the application as a snapshot image, and image restoration at a restoration target location so as to perform migration of the edge computing system (including a distributed cloud environment).

Each cloud may be configured using clusters, and high-speed connection may include a dedicated network connection method for tunneling in virtualization, a path bypassing method through network proxies, or the like.

The cloud service migration device 610 may connect the IP addresses of the node from which the corresponding snapshot is extracted and the node to which the snapshot is to be migrated to each other, through a predefined proxy service.

Figure 18:
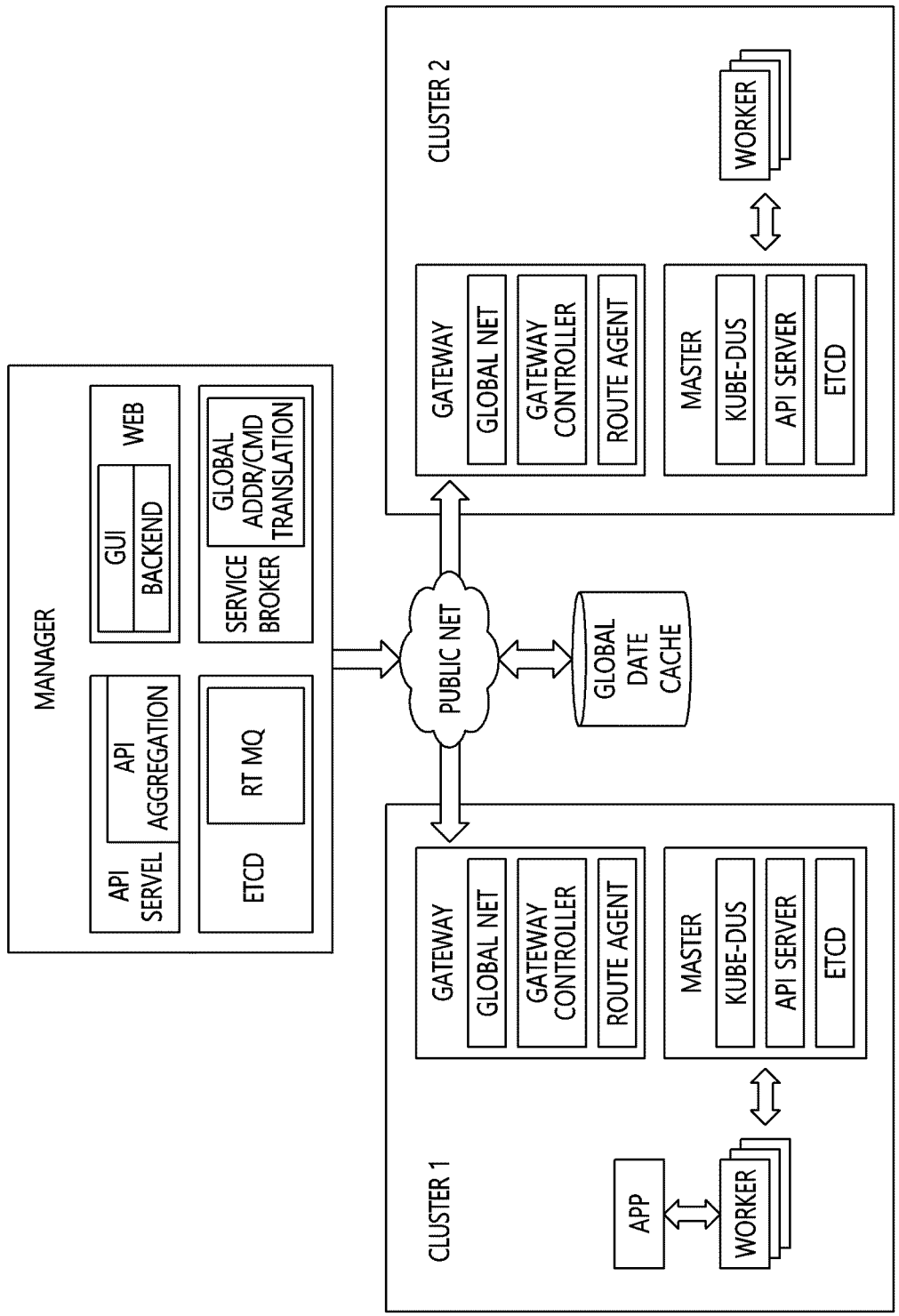
FIG. 18 is a diagram illustrating an uninterrupted service depending on the service migration of a distributed cloud system according to an embodiment of the present disclosure.

FIG. 18 is a diagram illustrating an uninterrupted service depending on the service migration of a distributed cloud system according to an embodiment of the present disclosure.

Referring to FIG. 18, a data processing method of the distributed cloud system according to the embodiment of the present disclosure may perform migration of applications and data depending on the movement of a user. In particular, in the distributed cloud system such as for edge computing, applications may be deployed and served in proximity to a user as a function for service collaboration. Accordingly, applications running on multiple servers, rather than just one application, need to be simultaneously migrated. Here, edge computing may result in latency or service interruptions as each service moves.

The distributed cloud system may perform failover to prevent such service interruptions from occurring, and may perform load balancing in service deployment in multiple clusters.

As illustrated in FIG. 18, the distributed cloud system may provide network connectivity between heterogeneous clusters through tunneling (e.g., IPsec) between multiple clusters.

The distributed cloud system may export a service from one cluster, that is, Cluster 1 to the other cluster, that is, Cluster 2 (service export), and a pod (application) deployed to Cluster 1 may access the service over the corresponding network.

A route agent may support service discovery to access the DNS server of Cluster 2 to which the service is exported, and may update the domain information of the corresponding service (domain name and IP address) in a registry, and all applications deployed to Cluster 2 may obtain the access IP address of the service exported from Cluster 1 by querying Cluster 2.

Therefore, this service export may obtain services in different clusters through DNS servers present in respective clusters. The service export may be implemented such that exported services are performed by route agents by notifying different clusters of service access paths therebetween.

Here, the corresponding service exposed to the other cluster may be seamlessly linked with other services in the other cluster through migration, load balancing or the like. Therefore, the distributed cloud system may seamlessly maintain service connectivity using a proxy server for edge computing and high availability (HA) or load balancing.

There are many cases where access IP addresses of most clusters are not exposed to the outside due to a security problem. Therefore, the distributed cloud system may create the corresponding access IP address through the proxy server, connect the access IP address to an internal connection IP address, and easily deploy the access IP address to places requiring the service. A HA proxy may support an access function depending on service movement while supporting health check for links and failover functions in association with the DNS server.

Figure 19:
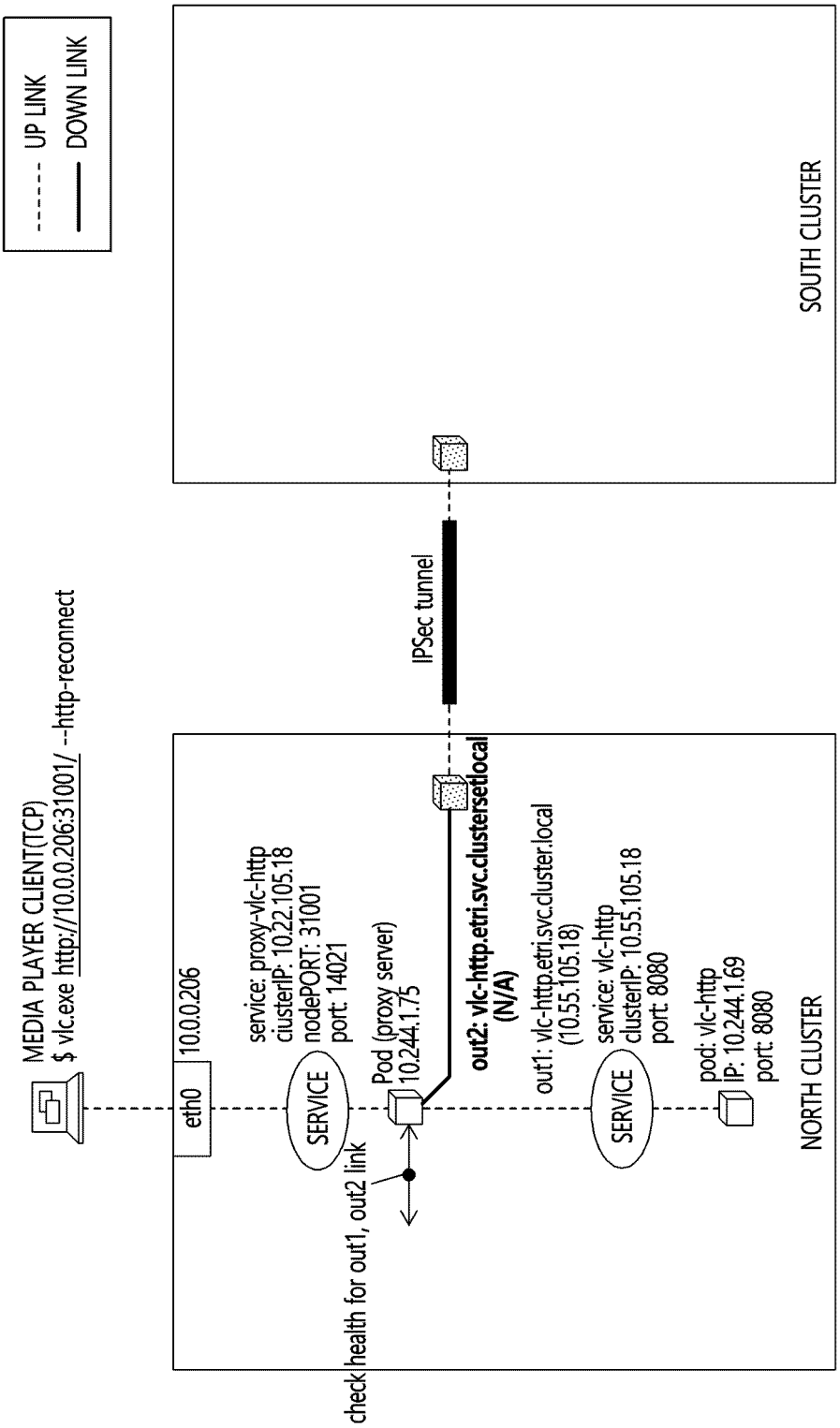
FIGS. 19 to 21 are diagrams illustrating a process of performing migration of a video application service in the uninterrupted service process of a distributed cloud system according to an embodiment of the present disclosure.
Figure 20:
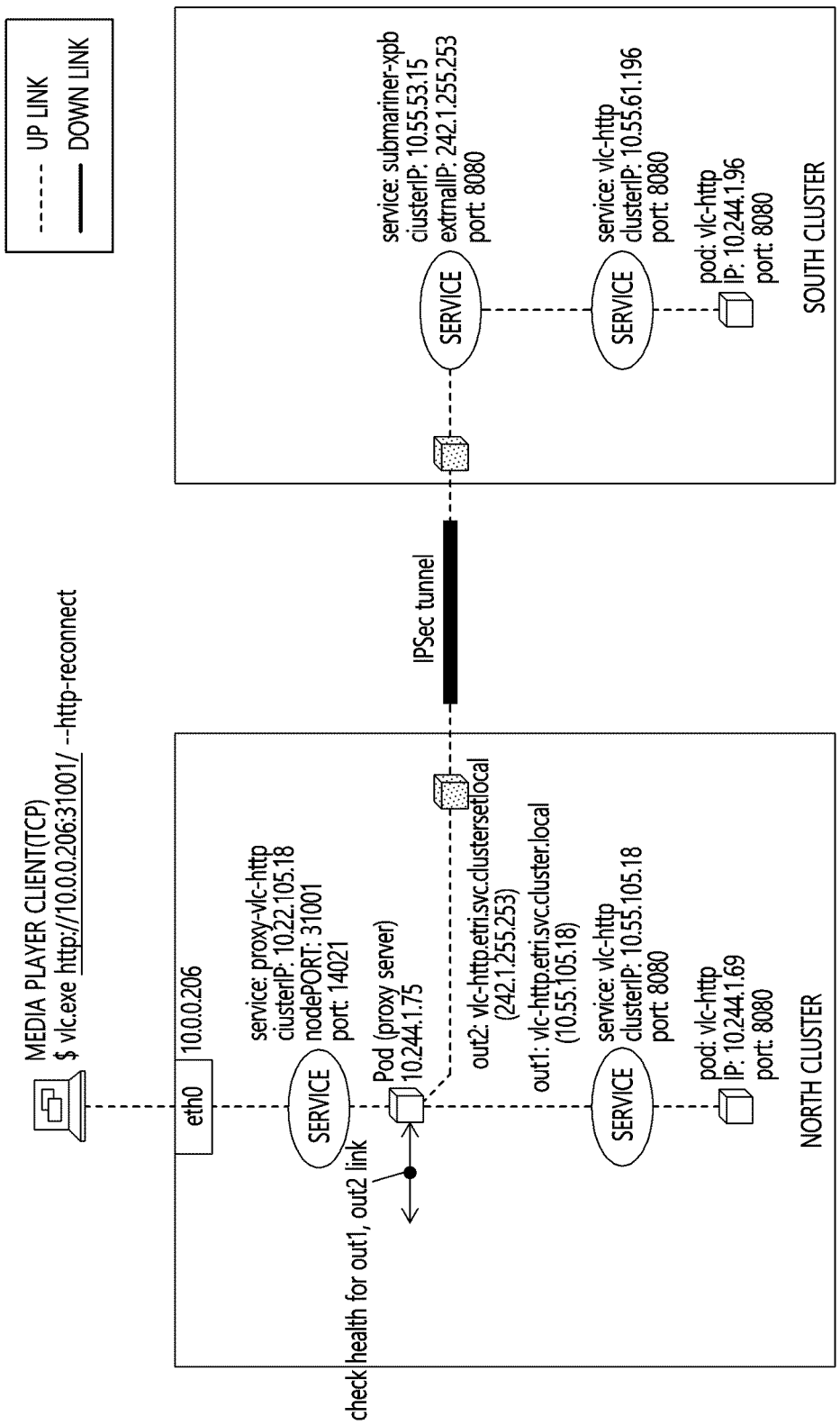
Figure 21:
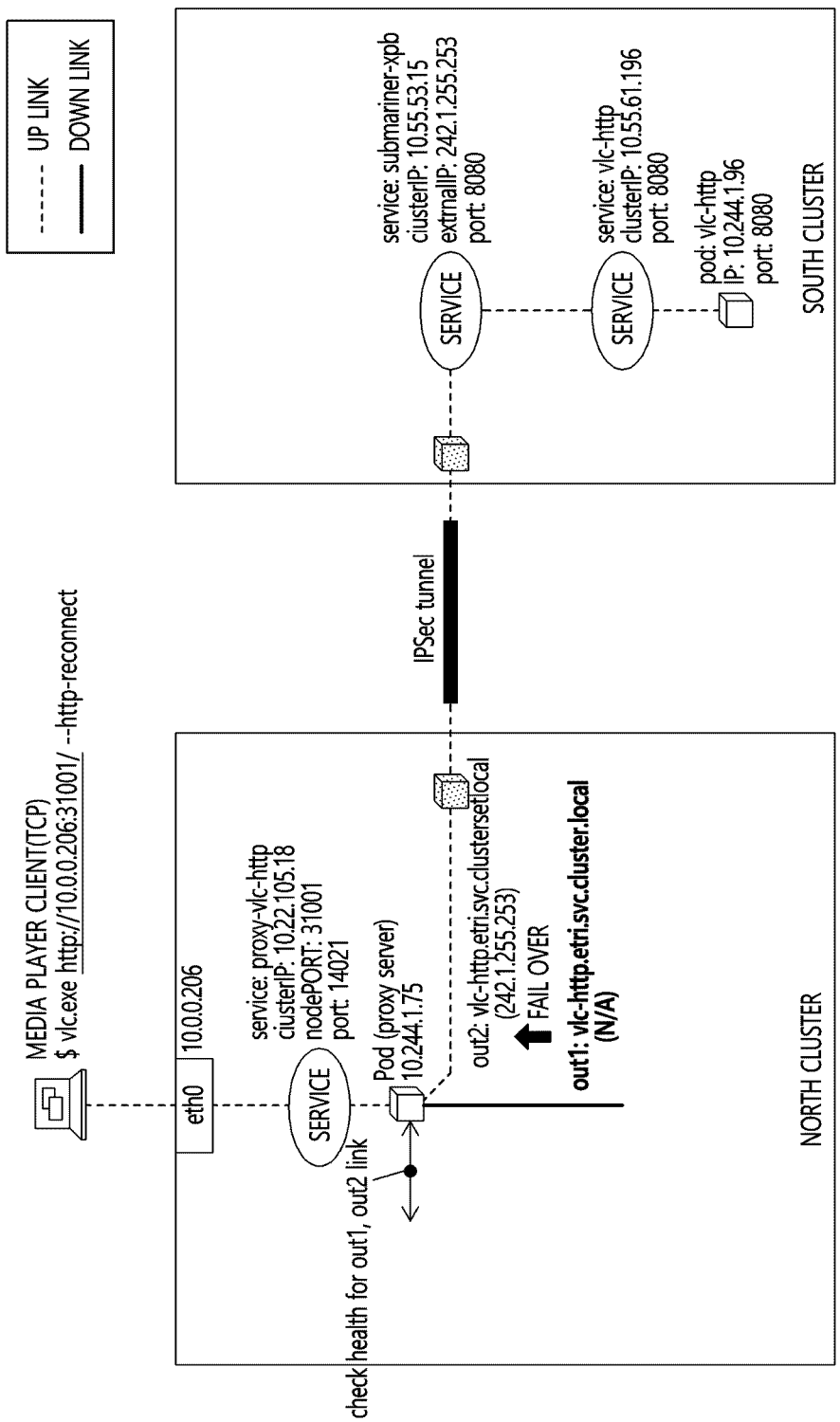

FIGS. 19 to 21 are diagrams illustrating a process of performing migration of a video application service in an uninterrupted service process of a distributed cloud system according to an embodiment of the present disclosure.

Referring to FIGS. 19 to 21, it can be seen that the data processing method of the distributed cloud system according to the embodiment of the present disclosure performs migration of a video application service in the uninterrupted service process.

Referring to FIG. 19, it can be seen that a media provision application and a service are deployed to a North cluster (vlc-http).

Here, a TCP-based proxy pod and a proxy service that are capable of supporting failover are deployed to the North cluster (proxy-vlc-http).

The proxy service supports a client connection (frontend connection) from a client present outside the cluster to nodePORT (e.g., 31001), and may support a vlc-http service connection (backend connection) by domain name.

The North cluster may support automatic failover from a downlink to an uplink by periodically checking the state of a domain access link of vlc-http.

A client may access a vlc-http server and play video streaming using an application client.

Referring to FIG. 20, it can be seen that, in order to move the service of the vlc-http application to the South cluster, a real-time container checkpoint is generated and stored in an associated shared repository, and the South cluster restores the container checkpoint.

After the South cluster restores the container checkpoint, the South cluster performs service export, the North cluster may activate vlc-http application and service links.

Referring to FIG. 21, when movement to the South cluster is completed, the North cluster may delete the application and service thereof.

When the service is deleted from the North cluster, the domain link of a local cluster (i.e., North cluster) may disappear simultaneously with the deletion, and the link of the South cluster may be automatically activated through the running proxy server, thus continuing to provide the service through the connection of the link of the South cluster.

Because the distributed cloud system does not support "export service" for a connection to a service that is not exposed due to security, a proxy for exposing an application IP address to the outside of the cluster may be provided.

The distributed cloud system may retrieve service name by querying a DNS server (domain name server) about the proxy for exposing the application IP address to the outside of the cluster.

Simultaneously with this, the distributed cloud system may provide a network connection to an activated service when a link is down by periodically checking the connection state of the IP address mapped to the service domain name.

Figure 22:
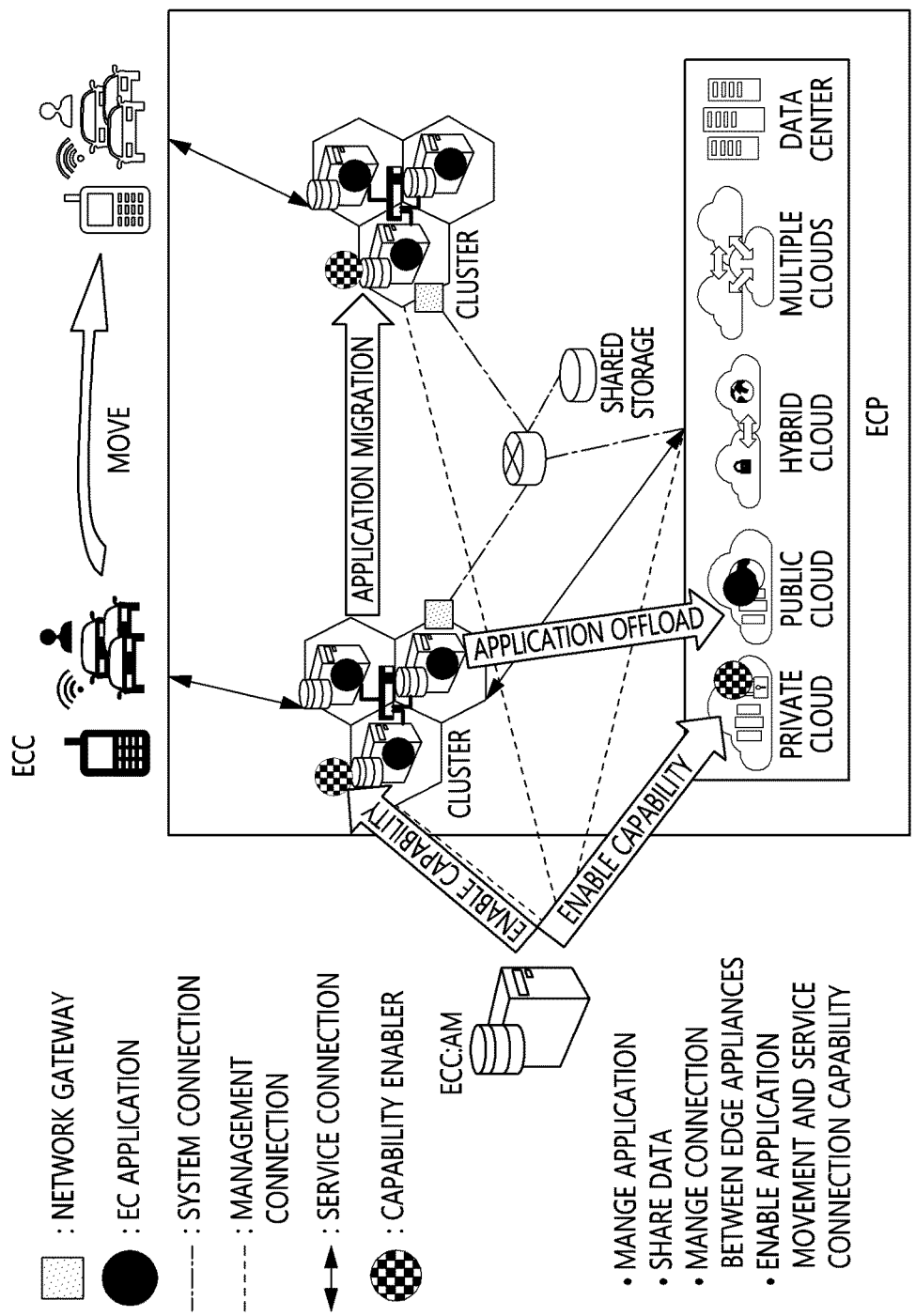
FIG. 22 is a diagram illustrating edge computing collaboration according to an embodiment of the present disclosure.

FIG. 22 is a diagram illustrating edge computing collaboration according to an embodiment of the present disclosure.

Referring to FIG. 22, in edge counting (EC), a data center (cloud computing), EC appliances, and Edge Configuration Clients (ECCs), which are present at different locations, may be connected to each other over a network, and edge appliances may be connected to each other. EC applications may run in a distributed form, or on the EC appliances that are clusters. Therefore, EC collaboration may include a function of maximizing the efficiency of distributed resources through workload offloading and service migration.

As illustrated in FIG. 22, collaborative capabilities may include the data center (cloud computing), collaboration between ECCs for vertical collaboration with EC appliances, and horizontal collaboration between the EC appliances.

As illustrated in FIG. 22, for EC collaboration, network connections between the EC appliances are required. Migration is composed of an application migration process and a related data migration process, and requires a stable and efficient method that is capable of capturing the state of the application in a format that can be transmitted in real-time and storing a snapshot in which the state of the running application is maintained. Offloading may include moving the role of a resource-intensive computational task to a separate processor appliance, such as a hardware accelerator, or an external device, such as a cloud data center, through resource load monitoring and network monitoring by a global scheduler.

For workload offloading and migration, migration and offloading of an EC application to run on each EC appliance may be led by management software for migration and a capability enabler (software) which provides an agent for performing migration on the EC appliance.

Further, in order to migrate the EC application and large-capacity data, EC may provide a storage interface for convenience of data movement and global shared storage for a high-speed network between EC appliances.

EC may provide the capability enabler.

The capability enabler may be a component in which software or hardware for performing an EC function is implemented.

In order to rapidly provide an EC function when virtualization technology is used, EC may deploy a capability enabler contained in a container or virtual machine.

EC may provide collaboration between the EC appliances to maximize the efficiency of distributed resources.

EC collaboration may include workload offloading and service migration.

Migration may be composed of the application migration process and the related data migration process.

Application migration may include a control process including checking an EC application state, identifying the target of each EC appliance, storing the current state of the EC application as a snapshot image, and restoring an image from a restoration target.

Migration of an EC appliance including remote and separated clusters may store and restore the snapshot of the state of the application that is actually running using shared or unified storage in which a high-speed network (e.g., a kernel bypass network) is present.

Offloading may include moving the role of the resource-intensive computational task to an additional EC appliance, such as a hardware accelerator, or an external device, such as a cloud data center, by utilizing migration or duplication.

Figure 23:
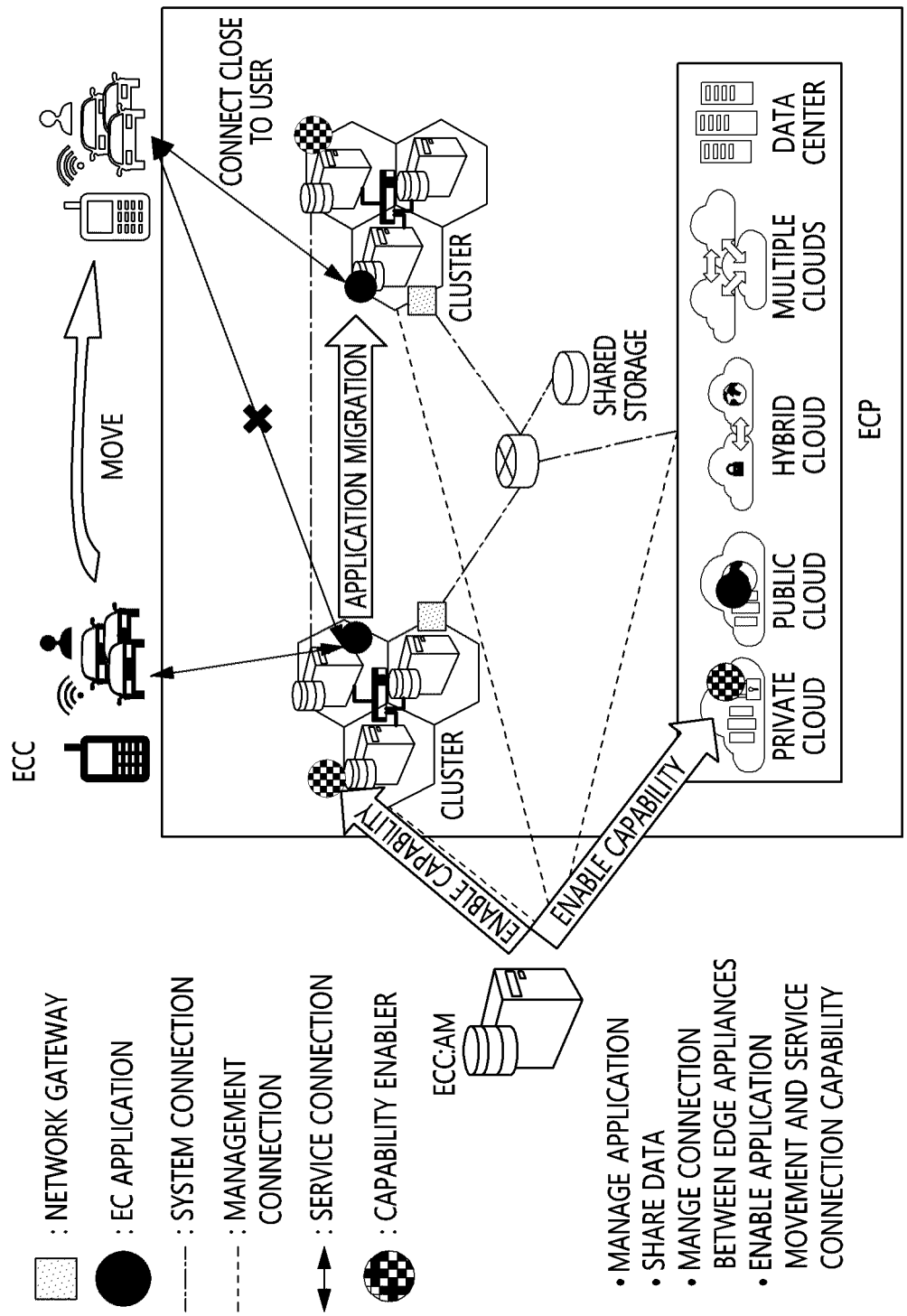
FIG. 23 is a diagram illustrating the case where a hyper-connection in edge computing is used according to an embodiment of the present disclosure.

FIG. 23 is a diagram illustrating the case where a hyperconnection in edge computing is used according to an embodiment of the present disclosure.

Referring to FIG. 23, this usage case shows an example of a hyperconnection meaning a network connection that enables a continuous service to be provided to a user in edge computing.

The hyperconnection presented as one of functions of edge computing may enable a continuous service depending on the movement of the user and an application in edge computing.

As illustrated in FIG. 23, each appliance that uses cloud computing and a data center may be remotely and separately operated with different IP addresses.

Edge Computing (EC) infrastructure implemented as an EC appliance may be connected to a network at the request of the user due to user proximity and data affinity.

When the EC appliance is already connected to the network, the service may be used over the connected network. Otherwise the network may be connected only through the public interface (IP address or URL) of the EC appliance.

Also, when the EC appliance is implemented as a cluster or a data center including cloud computing, an interface for accessing the application is protected and is not exposed to the outside.

Therefore, a network connection may utilize a gateway between network layers such as a network proxy-based routing rule, which uses a security tunneling-based network or an application layer, and basic routing for internal recognition in the cluster.

Furthermore, when failover is performed in order to prevent service interruptions or execute load balancing during service deployment, a hyperconnection function is required in the corresponding EC appliance.

The service information (IP address, domain name or URL) illustrated in FIG. 23 may be exposed to clusters shown in the left and right portions of the drawing to perform service movement so that the corresponding service is accessible.

Here, EC may support an uninterrupted (seamless) service depending on service movement between the two clusters using a High Availability (HA) proxy server or a load balancer.

The HA proxy server or the load balancer may check a connection in real time, and may perform failover through a new connection by utilizing service exposure when the network is disconnected.

Because the EC appliance (including cloud computing) needs to support a newly created service or the user's network connection request, service exposure for a gateway, a router, and a hyperconnection may be implemented by a container or a virtual machine, and may be activated on the EC appliance through ECC:AM.

EC may provide the availability of the EC appliance.

For user proximity, EC may perform a fast network connection and service for available resources.

Through the hyperconnectivity of the EC appliances, EC needs to be able to provide a network connection between the EC appliances.

The network connection between the EC appliances may include a gateway between network layers such as IPsec tunneling or routing rule-based proxy between application layers.

In the case of an EC appliance including a cluster, a network connection may be made using a router for internal recognition in the cluster.

Each of the router and the gateway may include a hardware device or software implemented as a container or a virtual machine so as to activate a hyperconnection function.

In the present disclosure, Edge Computing (EC) may provide a smooth network connection between the user and an EC application to implement hyperconnectivity for high availability.

EC may expose a service to each appliance so that an EC application interface (an IP address, a domain name or URL) which enables access to each appliance and the corresponding EC application can be searched for.

EC may provide a load balancer or a high availability proxy server so as to support an uninterrupted service depending on service movement.

The HA proxy server or the load balancer may check a connection, and may perform failover through a new connection by utilizing service exposure when the network is disconnected.

Figure 24:
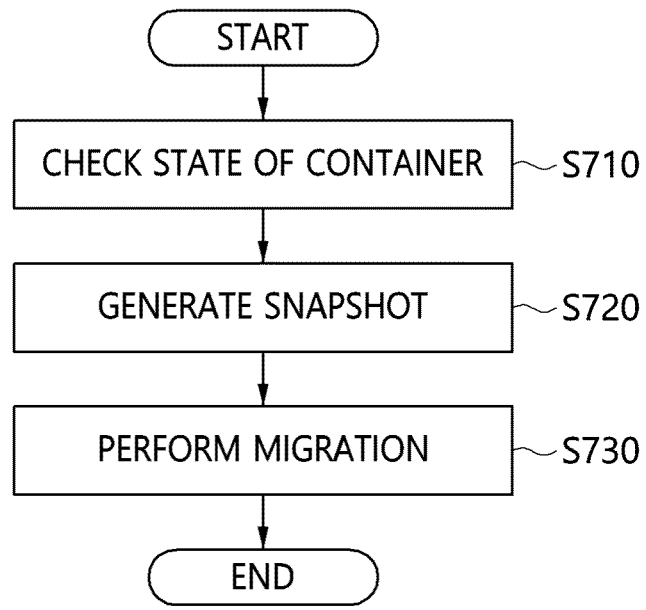
FIG. 24 is an operation flowchart illustrating a cloud service migration method of a distributed cloud system according to an embodiment of the present disclosure.

FIG. 24 is an operation flowchart illustrating a cloud service migration method of a distributed cloud system according to an embodiment of the present disclosure.

Referring to FIG. 24, the cloud service migration method included in the data processing method of the distributed cloud system according to the embodiment of the present disclosure may check the state of a container at step S710.

That is, at step S710, the cloud service migration device 610 may check the pod state of a migration target node 620 on an edge cloud through an offloading controller, and may extract the pod state.

Here, at step S710, the distributed cloud system may receive user requests for the edge cloud to control the distributed cloud system.

Here, the distributed cloud system may cloud a core cloud including large-scale resources, the edge cloud, and a local cloud including middle-scale resources between the core cloud and the edge cloud.

Here, at step S710, the distributed cloud system may process tasks corresponding to the user requests, distribute the tasks based on a queue, and aggregate the results of the tasks that have been processed.

A pod may be a single container or may be composed of multiple containers. The state of each container may be transmitted from a source pod to a destination pod.

Here, at step S710, the states of all containers may be checked in consideration of the order of dependency between the containers in the source pod/node.

The cloud service migration method according to the embodiment of the present disclosure may generate a snapshot at step S720.

In other words, at step S720, the live image file of the container may be dumped, and then the snapshot thereof may be generated.

Here, at step S720, the distributed cloud system may execute commands including the provision of processed data in response to the user requests.

Here, the commands may be used to perform a function of managing failure when failure occurs in the distributed cloud system.

The management function may include data movement (migration) control between edge clouds including the corresponding edge cloud.

The movement control may be performed to check the state of the edge cloud and store the current state of a snapshot image.

Furthermore, the cloud service migration method according to the embodiment of the present disclosure may perform migration at step S730.

That is, at step S730, the snapshot image may be transmitted to the checkpoint repository. The checkpoint repository may provide an additional management function so as to easily search for and process files (in association with a data management and deployment management function).

At step S730, the distributed cloud system may reduce snapshot transmission between the edge clouds using memory.

Here, at step S730, the distributed cloud system may perform migration of storing the snapshot image in a checkpoint repository corresponding to the shared storage of the edge clouds.

Here, at step S730, a network connection to a remote target node may be checked.

In detail, at step S730, migration may be performed through K8S CustomResourceDefinitions (CRD) in which a migration function is predefined (EC capability Enabler—Migration Manager).

At step S730, the checkpoint image and the pod state may be transmitted.

Here, at step S730, the state information of the checkpoint repository may be monitored.

At step S730, a checkpoint time point restoration call function may be provided.

In this case, at step S730, the restoration function of each container may be called in consideration of the dependency order of the containers from the snapshots stored in the checkpoint repository and container state files.

At step S730, the IP addresses of the node from which the corresponding snapshot is extracted and the node to which the snapshot is to be migrated may be connected to each other through a predefined proxy service.

Figure 25:
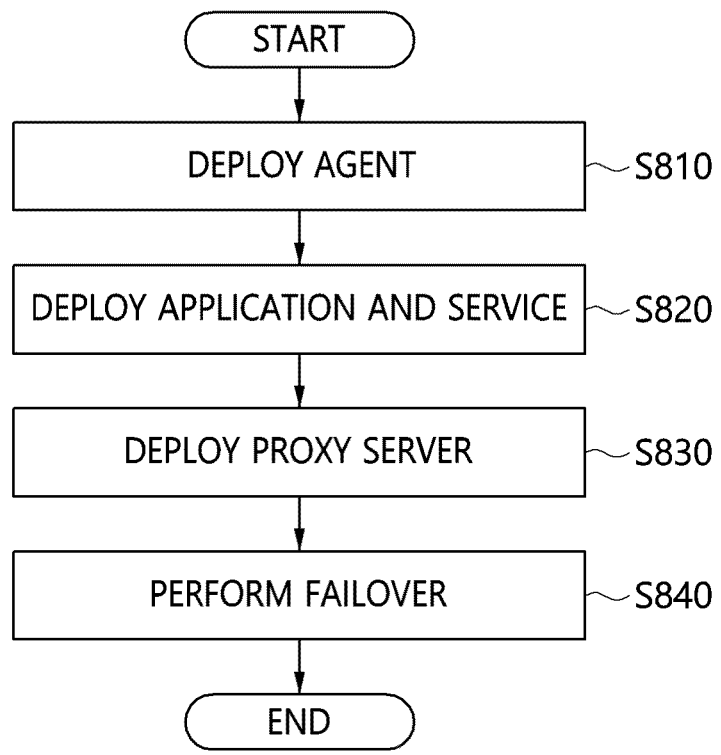
FIG. 25 is an operation flowchart illustrating an uninterrupted service method of a distributed cloud system according to an embodiment of the present disclosure.

FIG. 25 is an operation flowchart illustrating an uninterrupted service method of a distributed cloud system according to an embodiment of the present disclosure.

Referring to FIG. 25, the uninterrupted service method included in a data processing method of the distributed cloud system according to the embodiment of the present disclosure may first deploy an agent at step S810.

That is, at step S810, a network connection between heterogeneous clusters may be performed through tunneling (e.g., IPsec) between multiple clusters.

Here, at step S810, the agent (i.e., route agent) for the connection between individual clusters may be deployed after the network connection.

Further, the uninterrupted service method of the distributed cloud system according to the embodiment of the present disclosure may deploy an application and a service at step S820.

That is, at step S820, the application and service may be created and deployed to each cluster.

Furthermore, the uninterrupted service method of the distributed cloud system according to the embodiment of the present disclosure may deploy a proxy server at step S830.

That is, at step S830, a High Availability (HA) proxy server supporting failover and a service corresponding to the HA proxy server may be created and deployed.

In this case, the deployed proxy server may provide the service to the user by connecting to an IP address that is not exposed due to security, and the inside of the cluster may be connected to each node through a domain name.

Further, the uninterrupted service method of the distributed cloud system according to the embodiment of the present disclosure may perform failover at step S840.

That is, at step S840, after the network connection, the connection state of the network to access the domain may be periodically checked.

In this case, at step S840, when the network is disconnected, failover may be performed through a previously registered new connection.

Figure 26:
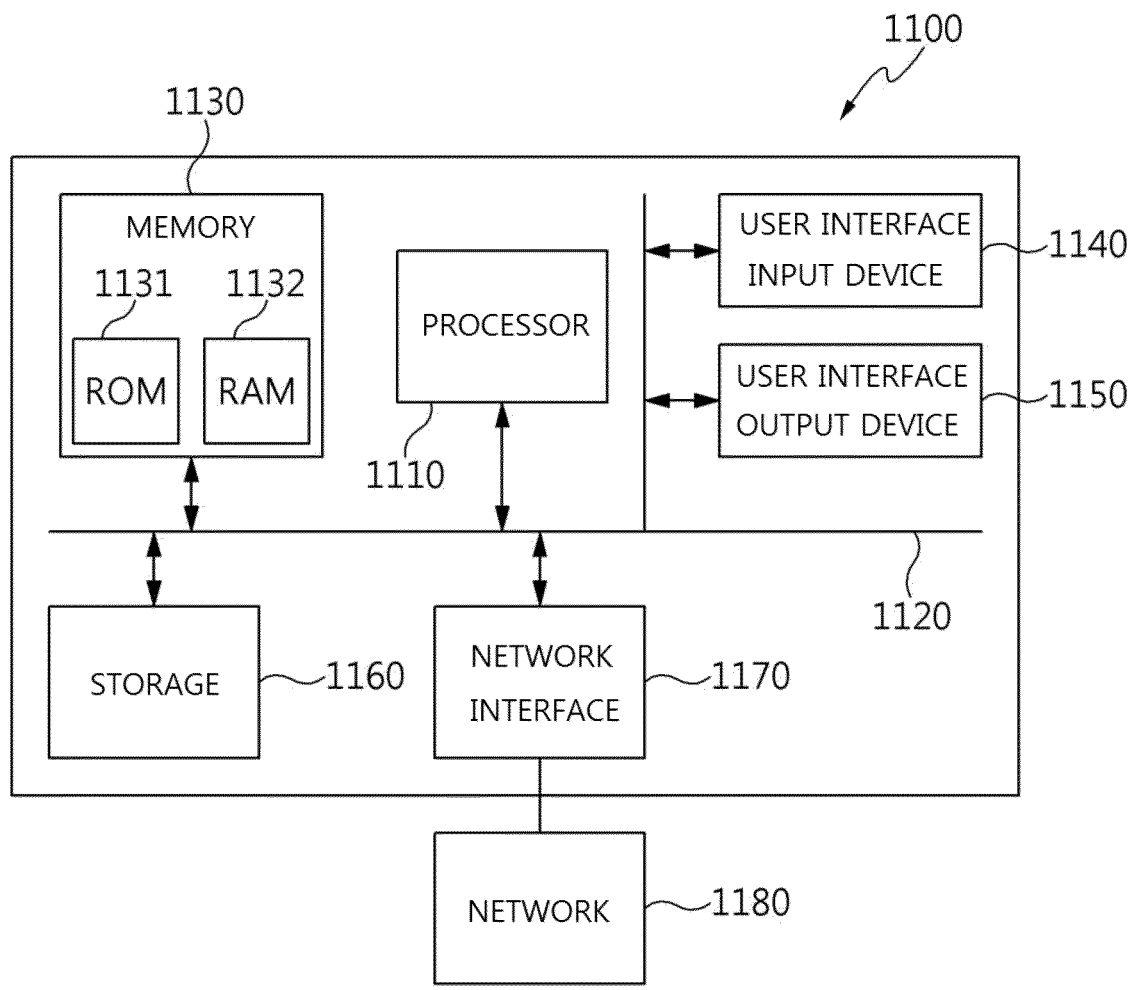
FIG. 26 is a diagram illustrating a computer system according to an embodiment of the present disclosure.

FIG. 26 is a diagram illustrating a computer system according to an embodiment of the present disclosure.

Referring to FIG. 26, each of a distributed cloud system and a storage medium thereof according to embodiments of the present disclosure may be implemented in a computer system 1100 such as a computer-readable storage medium. As illustrated in FIG. 26, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Further, a distributed cloud system according to an embodiment of the present disclosure may include one or more processors 1110 and memory 1130 configured to store at least one program that is executed by the one or more processors, wherein the one or more processors 1110 are configured to receive a request of a user for an edge cloud and control a distributed cloud system, wherein the distributed cloud system includes a core cloud including a large-scale resource, the edge cloud, and a local cloud including a middle-scale resource between the core cloud and the edge cloud, wherein the processor is configured to execute processes of processing tasks corresponding to the user request, distributing the tasks based on a queue, and aggregating results of processed tasks; and providing processed data in response to a request of the user, and wherein the processor is configured to perform a management function in case of failure in the distributed cloud system.

Here, the management function may include data movement control between multiple edge clouds including the edge cloud, the movement control may be configured to check states of the edge clouds and store current states of snapshot images, and transmission of the snapshot images between the edge clouds may be reduced using the memory.

Here, the processor may be configured to perform migration of storing the snapshot images in a checkpoint repository corresponding to a shared storage of the edge clouds.

Further, the processor may be configured to run an application of an edge computing system requested by an external device, generate a snapshot image of the application, and store the generated snapshot image in the storage and transmit the stored image during migration.

Here, the application may maintain an uninterrupted service connection with the external device.

Here, the current state of the application may be stored as the snapshot image.

Here, when migration is performed, the snapshot image may be restored.

Furthermore, there is provided storage 1160 that is a storage medium for storing a computer-executable program according to an embodiment of the present disclosure, the program executing instructions including receiving a request of a user for an edge cloud and controlling a distributed cloud system, wherein the distributed cloud system includes a core cloud including a large-scale resource, the edge cloud, and a local cloud including a middle-scale resource between the core cloud and the edge cloud; processing tasks corresponding to the user request, distributing the tasks based on a queue, and aggregating results of processed tasks; providing processed data in response to a request of the user, and wherein the instructions perform a management function in case of failure in the distributed cloud system.

Here, the management function may include data movement control between multiple edge clouds including the edge cloud, the movement control may be configured to check states of the edge clouds and store current states of snapshot images, and transmission of the snapshot images between the edge clouds may be reduced using a shared storage.

Here, the program may be configured to perform migration of storing the snapshot images in a checkpoint repository corresponding to a shared storage of the edge clouds.

Further, the storage 1160 may be configured to run an application of an edge computing system requested by a user device, generate a snapshot image of the application, and store the generated snapshot image in the storage and transmit the stored image during migration.

The distributed cloud system according to an embodiment of the present disclosure may smoothly support various distributed computing environments to provide an edge computing service.

The distributed cloud system according to an embodiment of the present disclosure may provide high-performance architecture for efficient collaboration between clusters.

The distributed cloud system according to an embodiment of the present disclosure may configure high-performance containers and a global cache for data association between the containers by utilizing a memory-based storage device for improving the efficiency of the container.

The distributed cloud system according to an embodiment of the present disclosure may provide a high-speed network connection between clusters to provide a collaboration service.

The distributed cloud system according to an embodiment of the present disclosure may configure a tunneling-based high-speed network to provide a collaboration service between clusters.

The distributed cloud system according to an embodiment of the present disclosure may provide management technology for collaboration between clusters on a connected network.

In the distributed cloud system according to an embodiment of the present disclosure, through the structure of a proposed system for optimization of vertical and horizontal collaboration between a cloud and an edge and an intelligent scheduling method, an application program developer may embody application of edge platform-based distributed collaboration, which associates vertical collaboration between edge-edge terminals with horizontal collaboration between an edge and a cloud edge, at system level.

The distributed cloud system according to an embodiment of the present disclosure may provide a service movement method and a service migration method for deploying a service in proximity to the user on a distributed cluster.

The distributed cloud system according to an embodiment of the present disclosure may provide the functionality of providing service movement through a service proxy server, and of allowing the user to seamlessly use the service while moving to another area.

The distributed cloud system according to an embodiment of the present disclosure may solve memory constraints, solve memory size constraints through a scalable storage structure configured in the present disclosure, and solve volatile characteristics through a backup/restore function based on a real-time snapshot backup environment.

The distributed cloud system according to an embodiment of the present disclosure may easily configure and use the system because a module is included in Linux through kernel-merged easy use.

The distributed cloud system according to an embodiment of the present disclosure may configure a high-speed network by applying a tunneling technique that uses a kernel bypass network stack in order to perform a network connection between multiple clusters at high speed by providing a user-level network tunneling connection between L3-level multiple clusters.

The distributed cloud system according to an embodiment of the present disclosure may provide an optimized intelligent scheduler function for collaboration.

The distributed cloud system according to an embodiment of the present disclosure may provide scheduling suitable for a low-latency service.

The distributed cloud system according to an embodiment of the present disclosure may provide vertical and horizontal integrated collaboration.

The distributed cloud system according to an embodiment of the present disclosure may apply collaboration at system level.

The distributed cloud system according to an embodiment of the present disclosure may provide intelligent offloading-based collaboration.

The distributed cloud system according to an embodiment of the present disclosure may provide a seamless service connection.

The distributed cloud system according to an embodiment of the present disclosure may provide integrated distributed processing including cloud/edge/near edge.

The distributed cloud system according to an embodiment of the present disclosure may generate efficient intelligent scheduler policies based on logs or statistical information.

The distributed cloud system according to an embodiment of the present disclosure may provide migration between clusters through a shared storage cache function based on a high-performance computing environment.

The present disclosure may provide service migration for efficient collaboration between clusters.

Further, the present disclosure may provide a high-speed network connection between multiple clusters for a collaboration service.

Furthermore, the present disclosure may provide optimal management for collaboration between clusters on a connected network.

As described above, in the distributed cloud system, the data processing method of the distributed cloud system, and the storage medium according to the present disclosure, the configurations and schemes in the above-described embodiments are not limitedly applied, and some or all of the above embodiments can be selectively combined and configured such that various modifications are possible.

What is claimed is:

1. A data processing method of a distributed cloud system including one or more cloud computing systems and an edge computing system, the data processing method comprising:
   running, at the edge computing system, an edge computing application requested by a user device,
   wherein the edge computing system is in a location close to the user device and different from the one or more cloud computing systems in the distributed cloud system,
   wherein the user device uses the edge computing application to store and send data,
   wherein the edge computing application uses high speed network to connect to the user device and to maintain uninterrupted service connection with the user device, and
   wherein the edge computing system maintains the uninterrupted computing service connection to the edge computing application in unexpected events of hardware or software failures or network disruptions;
   providing a high-availability proxy which periodically checks a network connection in the distributed cloud system, and performs a new connection using an exposure of service connection information when a network is disconnected;
   performing task offloading between the edge computing system and other resources in the distributed cloud system;
   generating a snapshot image of the edge computing application when the task offloading is performed and storing a current state of the edge computing application as the snapshot image; and
   transmitting the stored snapshot image during migration to the other resources in the distributed cloud system.

2. A distributed cloud system including one or more cloud computing systems and an edge computing system, the distributed cloud system comprising:
   a storage;
   a processor; and
   a network system coupled to the edge computing system,
   wherein the processor is configured to:
   run an edge computing application requested by a user device,
   wherein the edge computing system is in a location close to the user device and different from the one or more cloud computing systems in the distributed cloud system,
   wherein the user device uses the edge computing application to store and send data, wherein the edge computing application uses high speed network to connect to the user device and to maintain uninterrupted service connection with the user device, and wherein the edge computing system maintains the uninterrupted service connection to the edge computing application in unexpected events of hardware or software failures or network disruptions, provide a high-availability proxy which periodically checks a network connection in the distributed cloud system, and perform a new connection using an exposure of service connection information when a network is disconnected, perform task offloading between the edge computing system and other resources in the distributed cloud system, generate a snapshot image of the edge computing application when the task offloading is performed and storing a current state of the edge computing application as the snapshot image, and transmit the stored snapshot image during migration to the other resources in the distributed cloud system.

3. A non-transitory storage medium for storing a computer-executable program, the computer-executable program of a distributed cloud system including one or more cloud computing systems and an edge computing system, the program comprising:

running an edge computing application requested by a user device, wherein the user device uses edge computing application to store data and send data, wherein the edge computing application uses high speed network to connect to the user device and to maintain uninterrupted service connection with the user device, wherein the edge computing system is in a location close to the user device and different from the one or more cloud computing systems in the distributed cloud system, and wherein the distributed cloud system maintains the uninterrupted computing service connection to the edge computing application in unexpected events of hardware or software failures or network disruptions;

providing a high-availability proxy which periodically checks a network connection in the distributed cloud system, and performs a new connection using an exposure of service connection information when a network is disconnected;

performing task offloading between the edge computing system and other resources in the distributed cloud system;

generating a snapshot image of the edge computing application when the task offloading is performed and storing a current state of the edge computing application as the snapshot image; and transmitting the stored snapshot image during migration to the other resources in the distributed cloud system.

* * * * *